United States Patent
Kumano et al.

(10) Patent No.: US 11,603,819 B2
(45) Date of Patent: Mar. 14, 2023

(54) INTERNAL COMBUSTION ENGINE CONTROL DEVICE AND IGNITION DEVICE

(71) Applicant: Hitachi Astemo, Ltd., Hitachinaka (JP)

(72) Inventors: Kengo Kumano, Tokyo (JP); Kazuhiro Oryoji, Tokyo (JP); Masayuki Saruwatari, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/634,820

(22) PCT Filed: Jul. 7, 2020

(86) PCT No.: PCT/JP2020/026524
§ 371 (c)(1),
(2) Date: Feb. 11, 2022

(87) PCT Pub. No.: WO2021/059664
PCT Pub. Date: Apr. 1, 2021

(65) Prior Publication Data
US 2022/0325687 A1 Oct. 13, 2022

(30) Foreign Application Priority Data
Sep. 26, 2019 (JP) .............................. JP2019-175881

(51) Int. Cl.
*F02P 5/15* (2006.01)
*F02P 17/12* (2006.01)
*F02P 11/00* (2006.01)

(52) U.S. Cl.
CPC ............. *F02P 5/1502* (2013.01); *F02P 11/00* (2013.01); *F02P 17/12* (2013.01); *F02D 2200/022* (2013.01); *F02P 2017/125* (2013.01)

(58) Field of Classification Search
CPC ....... F02D 2200/022; F02P 5/145; F02P 5/15; F02P 5/1506; F02P 5/1512; F02P 5/152;
(Continued)

(56) References Cited

U.S. PATENT DOCUMENTS 4,048,973 A * 9/1977 Sanda ..................... F02B 19/12
123/287
5,109,817 A * 5/1992 Cherry ................ F02B 19/1004
123/285
(Continued)

FOREIGN PATENT DOCUMENTS

JP 2011-196342 A 10/2011
JP 5649160 * 1/2015 .............. F02P 11/04

OTHER PUBLICATIONS

International Search Report (PCT/ISA/210) issued in PCT Application No. PCT/JP2020/026524 dated Oct. 20, 2020 with English translation (five (5) pages).
(Continued)

*Primary Examiner* — Erick R Solis
(74) *Attorney, Agent, or Firm* — Crowell & Moring LLP

(57) ABSTRACT

In an engine including an auxiliary chamber having an ignition plug therein, an amount of heat generated in the auxiliary chamber tends to be large, and thus it is necessary to suppress abnormal combustion. However, when a sensor is added to the ignition plug, a manufacturing cost of the ignition plug tends to increase. An ECU 2 includes an auxiliary chamber temperature estimation unit 21 that estimates a temperature of the auxiliary chamber 42, and an ignition control unit 22 that delays an ignition timing at a first decrease degree defined in accordance with a change amount of the ignition timing with respect to the temperature of the auxiliary combustion chamber as the temperature of the auxiliary chamber 42 increases in a case where the estimated temperature of the auxiliary chamber 42 is included in a middle temperature region equal to or lower than a first set temperature.

15 Claims, 19 Drawing Sheets

(58) Field of Classification Search
CPC ..... F02P 5/1522; F02P 11/00; F02P 17/12; F02P 2017/121; F02P 2017/125
USPC ............ 123/253–293, 406.26, 406.55
See application file for complete search history.

(56) References Cited

U.S. PATENT DOCUMENTS

| | | | |
|---|---|---|---|
| 5,611,307 A * | 3/1997 | Watson ............... | F02B 43/10 123/259 |
| 2010/0101533 A1* | 4/2010 | Huschenbett ......... | F02D 35/028 123/406.19 |
| 2015/0059691 A1 | 3/2015 | Hergart et al. | |
| 2016/0177851 A1* | 6/2016 | Gruber ............... | F02D 41/0027 123/275 |
| 2016/0177854 A1* | 6/2016 | Gruber ............... | F02B 19/12 123/274 |

OTHER PUBLICATIONS

Japanese-language Written Opinion (PCT/ISA/237) issued in PCT Application No. PCT/JP2020/026524 dated Oct. 20, 2020 (three (3) pages).

* cited by examiner

INTERNAL COMBUSTION ENGINE CONTROL DEVICE AND IGNITION DEVICE

TECHNICAL FIELD

The present invention relates to an internal combustion engine control device and an ignition device.

BACKGROUND ART

In the related art, an ignition device (also referred to as an ignition coil) for an internal combustion engine provided in an engine of an automobile mainly includes a primary coil that causes a primary current to flow, a secondary coil in which a change in magnetic flux generated in the primary coil is induced to each other, and an igniter that controls energization and interruption of the primary current. In this ignition device, when an ignition control signal output from an ignition control device (For example, ECU: Engine Control Unit) changes from on to off and a primary current is cut off, a discharge spark is generated in an ignition plug by a high voltage generated in a secondary coil, and an air-fuel mixture is ignited.

With the recent enforcement of fuel consumption regulations, the ignition device is required to be downsized and have high output.

In addition, an ignition device having high durability even at a high voltage is required. Therefore, there is being provided an engine including an auxiliary combustion chamber (abbreviated as "auxiliary chamber") that guides a flame jet generated by ignition of fuel to a main combustion chamber (abbreviated as "main chamber") in a cylinder in which the fuel is injected, the main combustion chamber being capable of reciprocating a piston, and an ignition plug attached to the auxiliary chamber.

PTL 1 discloses that "an ignition plug is attached to a cylinder head such that a plug cover protrudes from a cylinder head side to a combustion chamber to allow an ignition chamber and the combustion chamber to communicate with each other through the communication hole, and when it is determined that the ignition plug is in an overload state in which a thermal load on the plug cover or an electrode becomes overload, an operating condition of the engine is changed to a side in which the thermal load on the plug cover or the electrode is reduced".

CITATION LIST

Patent Literature

PTL 1: JP 2011-196342A

SUMMARY OF INVENTION

Technical Problem

By the way, when an engine including an auxiliary chamber having an ignition plug therein is used, an amount of heat in the auxiliary chamber tends to be large. For this reason, when a high-load operation of a vehicle is continued, a temperature of an inner wall of the auxiliary chamber increases, and there is a risk that abnormal combustion (pre-ignition) may occur from a high temperature portion. However, in the ignition plug disclosed in PTL 1, it is necessary to add a pressure sensor that detects a pressure in the auxiliary chamber and a sensor that detects a discharge voltage, and a manufacturing cost of the ignition plug is likely to increase.

The present invention is made in view of such a situation, and an object thereof is to control an operation of an engine including an auxiliary chamber having an ignition plug therein without providing a new sensor or the like in the ignition plug.

Solution to Problem

An internal combustion engine control device of the present invention controls output of an internal combustion engine including a cylinder in which an air-fuel mixture in which a fuel injected by a fuel injection device and air taken in from an intake system are mixed is combusted in a main combustion chamber facing a piston, an auxiliary combustion chamber that communicates with the main combustion chamber and takes in the air-fuel mixture from the main combustion chamber, an ignition plug that is attached to the auxiliary combustion chamber and ignites the air-fuel mixture inside the auxiliary combustion chamber, and an ignition device configured to control an ignition timing of the ignition plug. The internal combustion engine control device includes an auxiliary combustion chamber temperature estimation unit configured to estimate a temperature of the auxiliary combustion chamber, and an ignition control unit configured to delay the ignition timing at a first decrease degree defined in accordance with a change amount of the ignition timing with respect to the temperature of the auxiliary combustion chamber as the temperature of the auxiliary combustion chamber increases when the estimated temperature of the auxiliary combustion chamber is included in a middle temperature region equal to or lower than a first set temperature.

Advantageous Effects of Invention

According to the present invention, an operation of an engine including an auxiliary chamber having an ignition plug therein can be controlled by estimating a temperature of an auxiliary combustion chamber without providing a new sensor or the like in the ignition plug.

Objects, configurations, and effects other than those described above will be clarified by the following description of an embodiment.

FIG. is a diagram illustrating an example of changes in an ignition control signal and an ion signal according to the fourth embodiment of the present invention.

Figure 21:
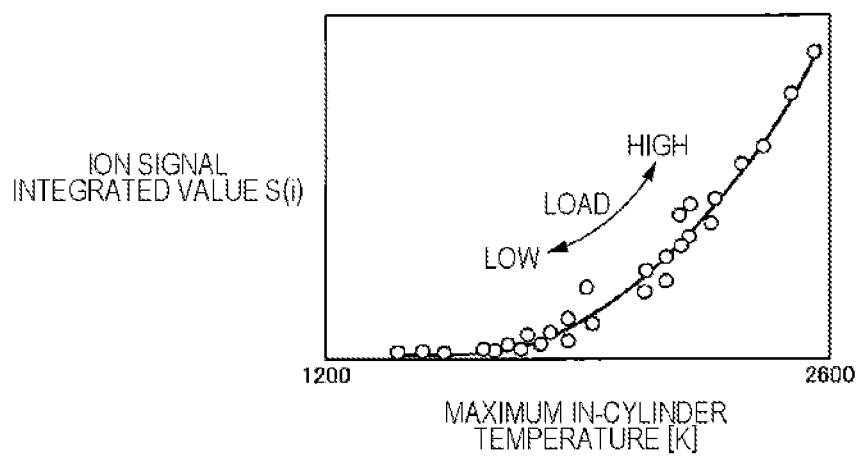

FIG. 21 is a diagram illustrating a relationship between an integrated value of the ion signal and a maximum temperature in a cylinder according to a fourth embodiment of the present invention.

DESCRIPTION OF EMBODIMENTS

Hereinafter, embodiments of the present invention will be described with reference to the accompanying drawings. In the present specification and the drawings, components having substantially the same function or configuration are denoted by the same reference numerals, and repeated descriptions thereof are omitted.

First Embodiment

Figure 1:
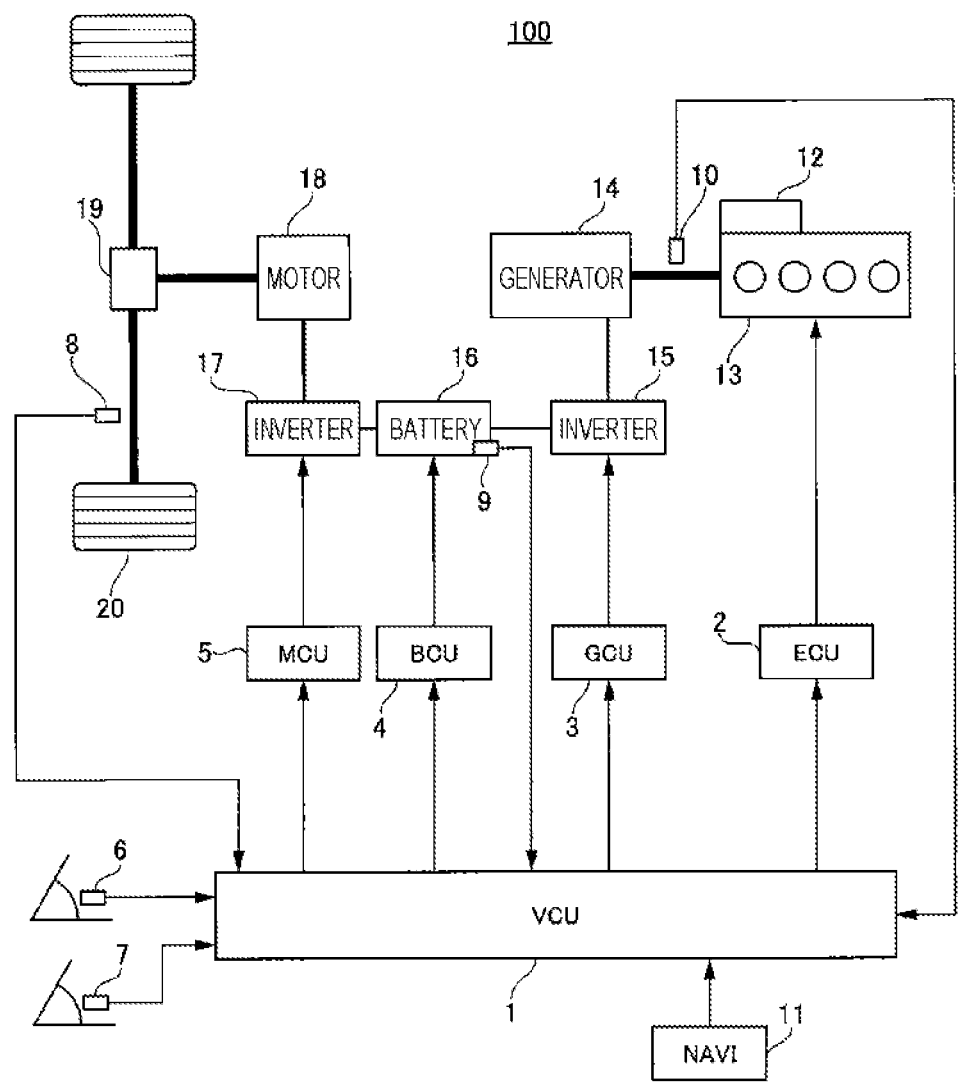
FIG. 1 is a schematic configuration diagram illustrating an example in which a control device mounted on a hybrid automobile according to a first embodiment of the present invention is applied to a series hybrid automobile.

FIG. 1 is a schematic configuration diagram illustrating an example in which a control device mounted on a hybrid automobile according to a first embodiment of the present invention is applied to a series hybrid automobile.

A hybrid automobile 100 includes an internal combustion engine (engine 13) as a drive source. The hybrid automobile 100 is provided with a navigation device 11 that acquires a current position of the hybrid automobile 100. The navigation device 11 receives GPS signals transmitted from a plurality of global positioning system (GPS) satellites above the hybrid automobile 100 on satellite radio waves, measures a current position, and displays a current position on a map displayed on a display device in the hybrid automobile 100. For positioning of the current position by the navigation device 11, a base station of a mobile phone terminal, an access point of Wi-Fi (registered trademark), or the like may also be used in combination. Information on the current position of the hybrid automobile 100 measured by the navigation device 11 and map information including a periphery where the hybrid automobile 100 travels and a route to a destination are output to a vehicle control device, that is, a vehicle control unit (VCU) 1.

An accelerator opening sensor 6 and a brake switch 7 are provided in a cabin of the hybrid automobile 100. The accelerator opening sensor 6 detects a depression amount of an accelerator pedal, that is, an accelerator opening. The brake switch 7 detects whether the brake pedal is depressed.

The engine 13 is a four-cylinder gasoline engine for an automobile using spark ignition type combustion, and is an example of an internal combustion engine. The engine 13 includes a starter 12 for starting the engine 13. A crank shaft of the engine 13 is provided with a crank angle sensor 10 for detecting a rotation angle thereof, and the other end of the crank shaft is connected to a generator 14.

A generator control device, that is, a generator control unit (GCU) 3 controls driving of the generator 14 via an inverter 15 so that the inverter 15 can charge a battery 16 with a predetermined voltage. The generator 14 is driven by the engine 13 to generate power, and charges the battery 16 via the inverter 15.

A battery control device, that is, a battery control unit (BCU) 4 controls charging and discharging of the battery 16 on the basis of a battery request output from the VCU 1. The battery 16 is provided with a battery voltage sensor 9 that measures an internal voltage of the battery 16, and the VCU 1 constantly checks the voltage of the battery 16.

A motor control device, that is, a motor control unit (MCU) 5 controls the inverter 17 and a motor 18 on the basis of a motor request output from the VCU 1. Power is supplied to the inverter 17 from the battery 16 that is electrically connected. Then, the inverter 17 converts DC power discharged from the battery 16 into AC power and supplies the AC power to the motor 18. The motor 18 is connected to a wheel 20 via a reduction gear 19. An automobile speed sensor 8 is provided on a drive shaft of the wheel 20.

Each signal output from the automobile speed sensor 8, the battery voltage sensor 9, and the crank angle sensor 10 is transmitted to the VCU 1. Signals output from the accelerator opening sensor 6 and the brake switch 7 are also transmitted to the VCU 1.

The VCU 1 is mounted on an automobile (hybrid automobile 100) that travels by an output of at least one of an internal combustion engine (engine 13) and an electric drive unit (motor 18). The VCU 1 calculates required torque of a driver based on the output signal of the accelerator opening sensor 6. That is, the accelerator opening sensor 6 is used as a required torque detection sensor that detects pieces of required torque of the engine 13 and the motor 18. Further, the VCU 1 determines the presence or absence of a deceleration request of the driver based on the output signal of the brake switch 7. In addition, the VCU 1 calculates a remaining power amount of the battery 16 based on the output signal of the battery voltage sensor 9. Further, the VCU 1 calculates the rotation speed of the engine 13 based on the output signal of the crank angle sensor 10. Then, the VCU 1 calculates an optimum operation amount of each device such as an engine request output, a motor request output, and a battery request output based on the driver request obtained from the outputs of the various sensors and an operation state of the hybrid automobile 100.

The engine request output calculated by the VCU 1 is transmitted to an engine control device, that is, the ECU 2. The internal combustion engine control device (ECU 2) controls the output of the internal combustion engine (engine 13) based on a request output from the VCU 1. Specifically, the ECU 2 controls the starter 12 in addition to a fuel injection unit, an ignition unit, and a throttle valve. The motor request output calculated by the VCU 1 is transmitted to an MCU 5. The battery request output calculated by the VCU 1 is transmitted to a BCU 4.

Next, an internal configuration of the VCU 1 in the first embodiment will be described.

Figure 2:
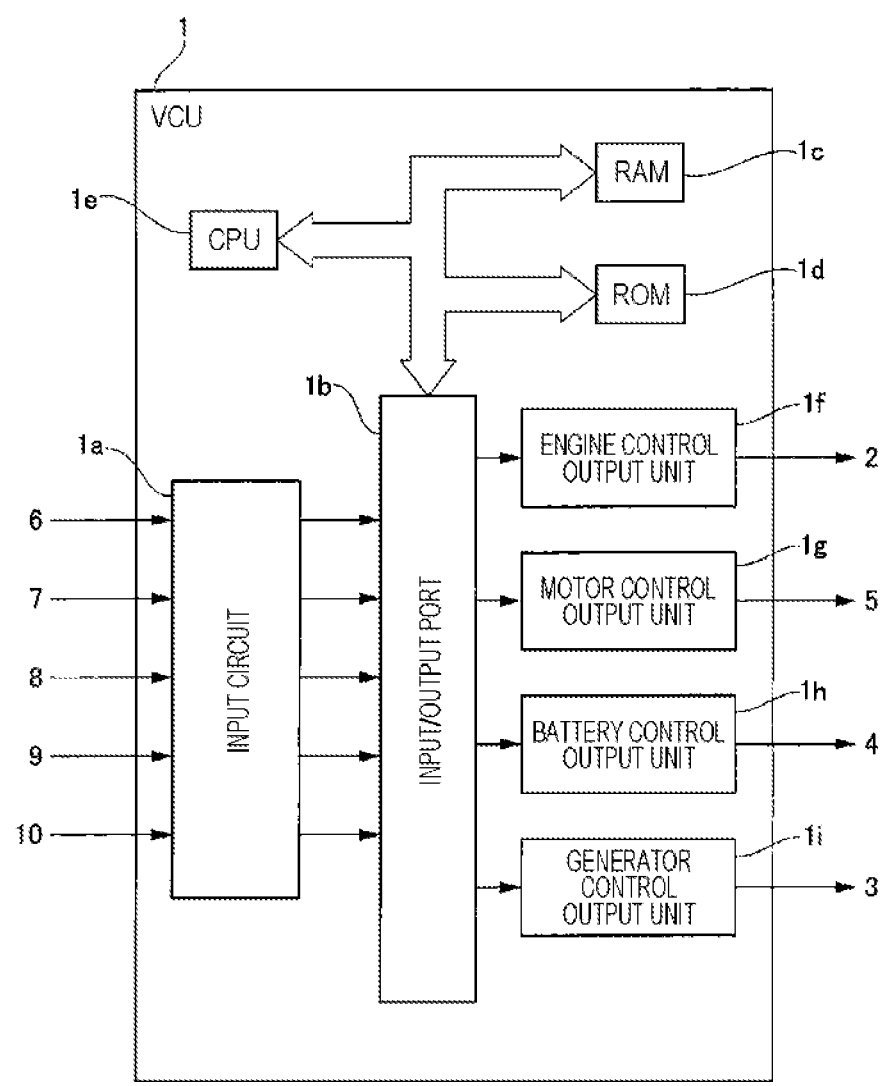
FIG. 2 is a block diagram illustrating a hardware configuration example of a vehicle control unit (VCU) according to the first embodiment of the present invention.

FIG. 2 is a block diagram illustrating a hardware configuration example of the VCU 1.

Each output signal output from the accelerator opening sensor 6, the brake switch 7, the automobile speed sensor 8, the battery voltage sensor 9, and the crank angle sensor 10 is input to an input circuit 1a of the VCU 1. However, the input signal is not limited thereto. The input signal of each sensor input to the input circuit 1a is transmitted to an input port (not illustrated) in an input/output port 1b. A value transmitted to the input port is stored in a RAM 1c and is subjected to arithmetic processing by a CPU 1e. A control program describing contents of the arithmetic processing is written in a ROM 1d in advance.

A value indicating an operation amount of a control target (engine 13, generator 14, battery 16, motor 18, or the like) calculated according to the control program is stored in the RAM 1c, then transmitted to an output port (not illustrated) in the input/output port 1b, and transmitted to each device via each output unit. Here, examples of the output unit include an engine control output unit 1f, a motor control output unit 1g, a battery control output unit 1h, and a generator control output unit 1i. Circuits of these output units are connected to the ECU 2, the MCU 5, the BCU 4, and the GCU 3. In FIG. 2, the control device (ECU 2, MCU 5, BCU 4, and GCU 3) of the control target is provided separately from the VCU 1, but the present invention is not limited to this mode, and a functional unit corresponding to the control device of each device may be provided in the VCU 1.

<Conventional Ignition Plug>

Here, before describing the ignition plug according to the present embodiment, a configuration example and an operation example of a conventional ignition plug will be described with reference to FIG. 3.

Figure 3:
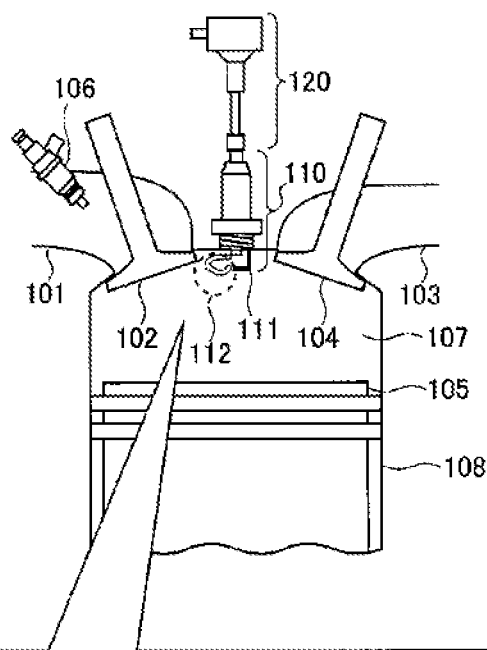
FIG. 3 is a diagram illustrating an installation example of conventional ignition plug and ignition device.
Figure 3:
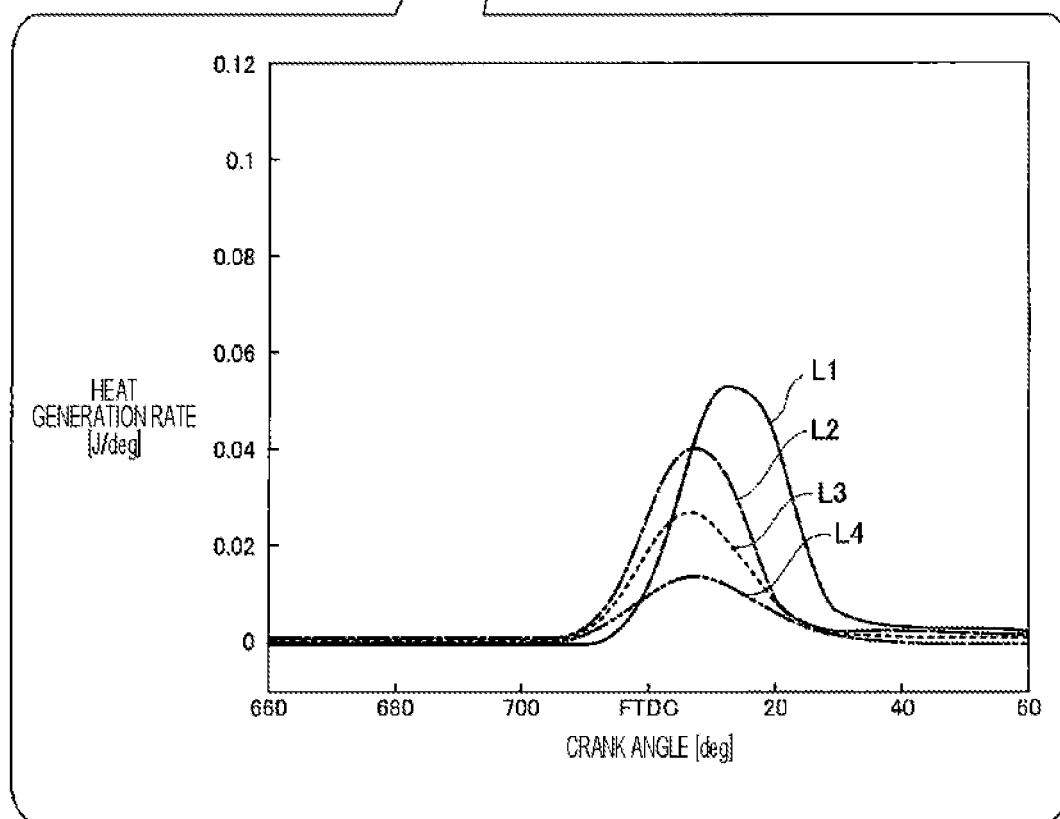

FIG. 3 is a diagram illustrating an installation example of conventional ignition plug 110 and ignition device 120. The ignition device 120 is installed immediately near the ignition plug 110.

An ignition device 120 that applies a high voltage to the ignition plug 110 is connected to the ignition plug 110. An intake manifold 101 is provided with an injector 106. The injector 106 performs fuel injection according to a fuel injection command output from the ECU. An air-fuel mixture in which air taken in from the intake manifold 101 and a fuel injected from the injector 106 are mixed is supplied to a combustion chamber 107. The air-fuel mixture is introduced into the combustion chamber 107 from the moment when a piston 105 provided in a cylinder 108 of the engine is lowered and an intake valve 102 is opened.

Thereafter, the intake valve 102 is closed, and the air-fuel mixture compressed in a process of raising the piston 105 is ignited in the vicinity immediately before a compression top dead center. The ignition of the air-fuel mixture is performed by a spark discharge generated in an electrode 111 (ground electrode and center electrode) when the ignition device 120 applies a high voltage to the ignition plug 110. A state of the spark discharge is illustrated in a region 112 indicated by a broken line in the drawing. The air-fuel mixture ignited by the spark discharge rapidly expands and pushes down the piston 105 to generate engine torque. Thereafter, the piston 105 is raised, and exhaust gas is discharged to an exhaust pipe 103 from the moment when an exhaust valve 104 is opened.

In the combustion chamber 107, ignition of the air-fuel mixture is started from the spark discharge generated in the electrode 111. A heat generation rate of heat generated by ignition of the air-fuel mixture is expressed by a relationship with a crank angle of the piston 105. A graph illustrating a change in the heat generation rate illustrated on a lower side of FIG. 3 is represented as curves L1 to L4. The curve L1 represents a state of the highest torque, and a curve L4 represents a state of the lowest torque. The curves L2 and L3 represent a state of torque lower than the curve L1 and higher than the curve L4.

<Configuration Example of Engine Including Auxiliary Chamber Including Ignition Plug Therein>

Next, a configuration example and an operation example of the ignition plug according to the first embodiment will be described with reference to FIG. 4. In the present embodiment, a configuration in which an auxiliary chamber forming member 45 forming an auxiliary chamber 42 is attached to an ignition plug 40 and the ignition plug 40 integrated with the auxiliary chamber forming member 45 is attached to an engine 13 will be described. However, the present invention is not limited to this configuration, and the auxiliary chamber forming member 45 forming the auxiliary chamber 42 may be attached to the engine, and the ignition plug 40 may be attached to the auxiliary chamber forming member 45. Any of these cases will be described with reference to FIG. 4.

Figure 4:
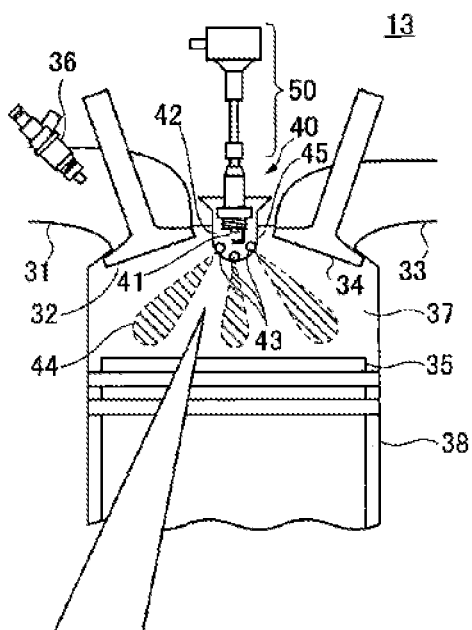
FIG. 4 is a diagram illustrating an installation example of an ignition plug and an ignition device according to the first embodiment of the present invention.
Figure 4:
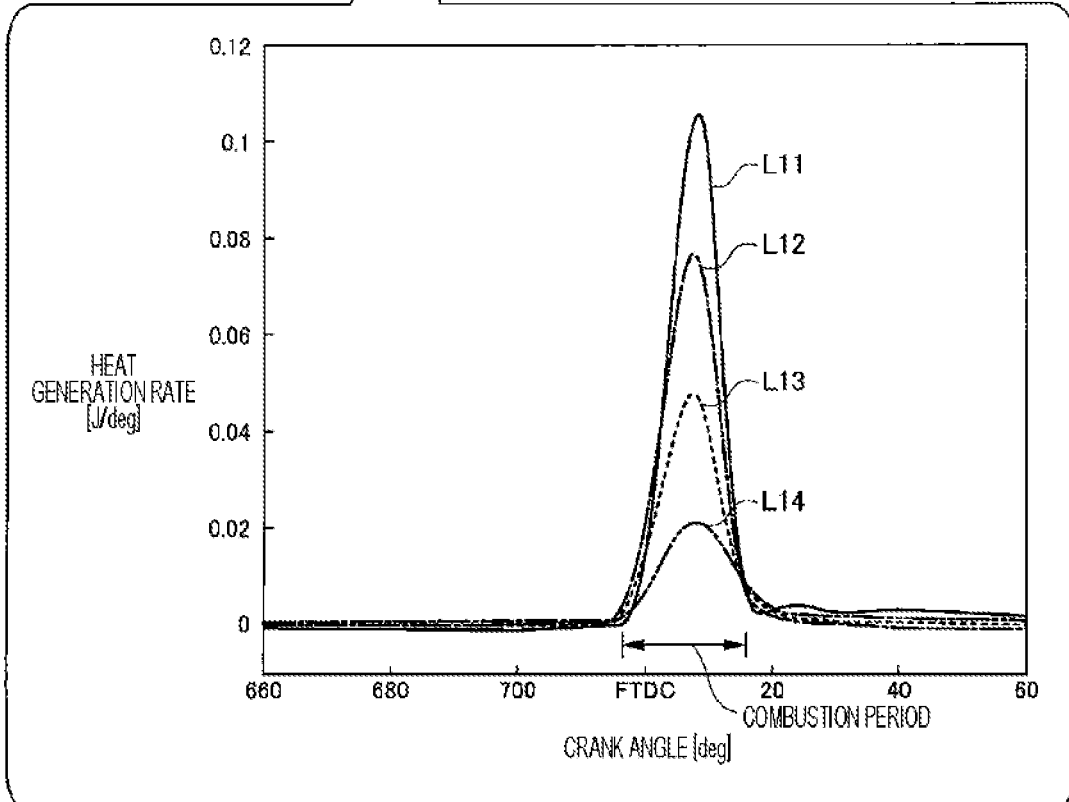

FIG. 4 is a diagram illustrating an installation example of the ignition plug 40 and an ignition device 50 according to the first embodiment. An internal combustion engine (engine 13) includes a cylinder (cylinder 38) in which an air-fuel mixture in which fuel injected by a fuel injection device (injector 36) and air taken in from an intake system (intake manifold 31) are mixed is combusted in a main combustion chamber (main chamber 37) facing a piston (piston 35), an auxiliary combustion chamber (auxiliary chamber 42) that communicates with the main combustion chamber (main chamber 37) and takes in the air-fuel mixture from the main combustion chamber (main chamber 37), an ignition plug (ignition plug 40) that is attached to the auxiliary combustion chamber (auxiliary chamber 42) and ignites the air-fuel mixture inside the auxiliary combustion chamber (auxiliary chamber 42), and an ignition device (ignition device 50) that controls an ignition timing of the ignition plug (ignition plug 40). The ignition device 50 that applies a high voltage to the ignition plug 40 is installed immediately near the ignition plug 40.

Functions of the intake manifold 31, an intake valve 32, an exhaust pipe 33, an exhaust valve 34, the piston 35, the injector 36, the main chamber 37, and the cylinder 38 illustrated in FIG. 4 are the same as those of the intake manifold 101, the intake valve 102, the exhaust pipe 103, the exhaust valve 104, the piston 105, the injector 106, the combustion chamber 107, and the cylinder 108 illustrated in FIG. 3, and thus, detailed descriptions thereof are omitted.

The ignition plug 40 includes an electrode 41 (ground electrode and center electrode), and the electrode 41 is covered by the auxiliary chamber forming member 45 to form the auxiliary chamber 42 (an example of an auxiliary combustion chamber). The auxiliary chamber 42 is installed to pass through the main chamber 37 (an example of a "main combustion chamber"). A plurality of holes 43 formed at a tip of the auxiliary chamber 42 are in the main chamber 37, and the air-fuel mixture that has passed through the holes 43 is taken into the auxiliary chamber 42 as the piston 35 is raised in a compression stroke. Then, in a combustion stroke, the electrode 41 generates a spark discharge in the auxiliary chamber 42 by the high voltage applied to the electrode 41 by the ignition device 50. The flame generated in the auxiliary chamber 42 by the spark discharge passes through the hole 43 and is jetted into the main chamber 37 as a plurality of flame jets 44, and the air-fuel mixture is ignited at multiple points. The air-fuel mixture combusted by the flame jet 44 pushes down the piston 35.

A graph illustrating changes in a heat generation rate illustrated on a lower side of FIG. 4 is represented as curves L11 to L14.

The curve L11 represents a state of the highest torque, and the curve L14 represents a state of the lowest torque. The curves L12 and L13 represent a state of torque lower than the curve L11 and higher than the curve L14. In addition, a period in which the heat generation rate of each of the curves L11 to L14 is larger than 0 indicates a combustion period in which the air-fuel mixture is combusted.

As illustrated in FIGS. 3 and 4, the conventional ignition plug 110 and the ignition plug 40 according to the present embodiment have different combustion methods and different combustion speeds. That is, in the conventional ignition plug 110, the air-fuel mixture is ignited in the combustion chamber 107, whereas in the ignition plug 40 according to the present embodiment, the air-fuel mixture is ignited in the auxiliary chamber 42. Therefore, FIGS. 3 and 4 illustrate that the combustion speed of the ignition plug 40 according to the present embodiment is higher than the combustion speed of the conventional ignition plug 110.

Figure 5:
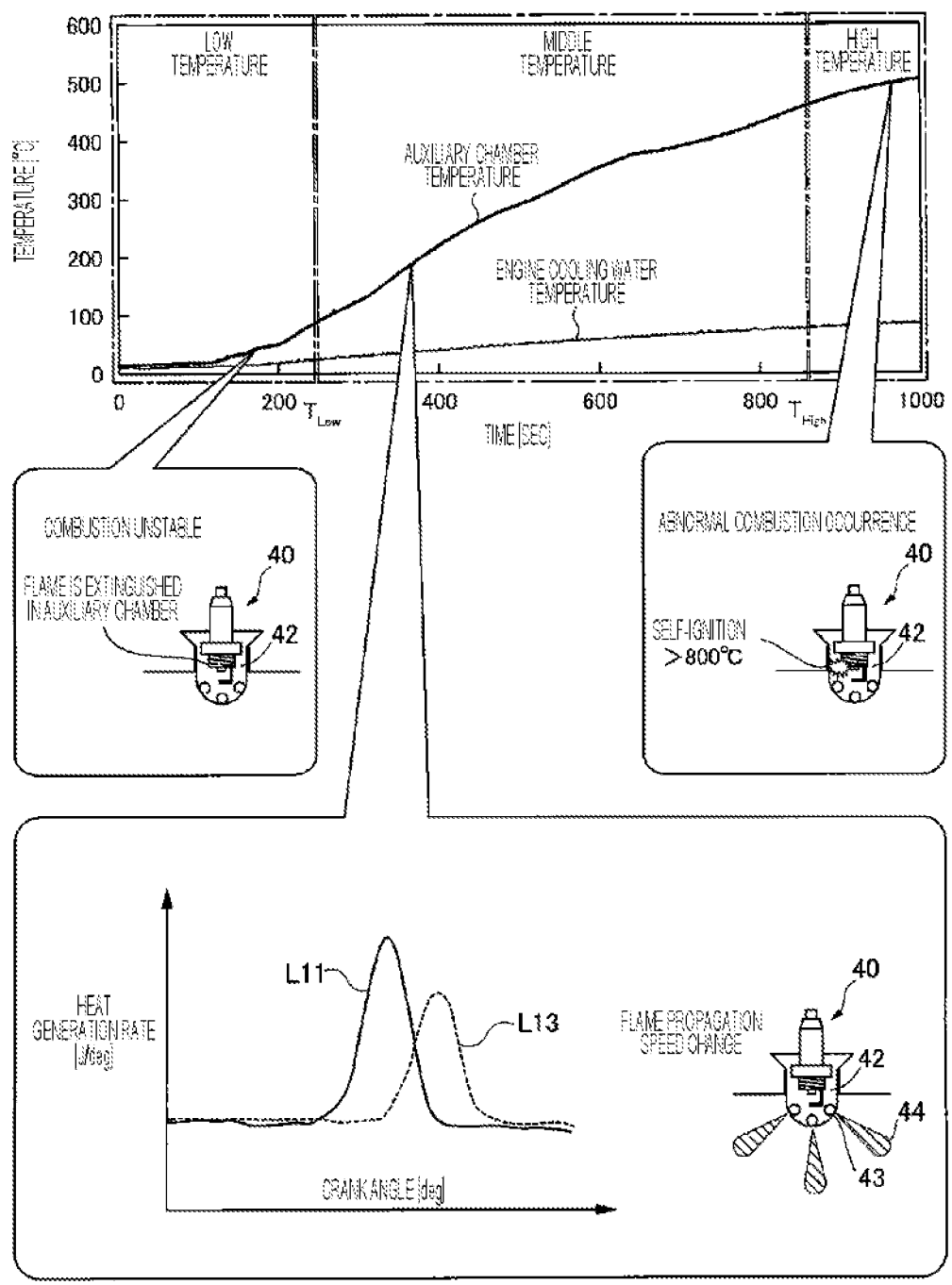
FIG. 5 is a diagram illustrating an example of a change in auxiliary chamber temperature and a change in a combustion state of the ignition plug according to the first embodiment of the present invention.

FIG. 5 is a diagram illustrating an example of a change in auxiliary chamber temperature and a change in a combustion state (referred to as "state of combustion in auxiliary chamber") in the auxiliary chamber 47 of the ignition plug 40.

On the upper side of FIG. 5, changes in the auxiliary chamber temperature and the engine cooling water temperature with a horizontal axis representing a time [sec] and a vertical axis representing a temperature [° C.] are represented by two types of graphs. The auxiliary chamber temperature that is initially low changes to a middle temperature (higher than 200° C. to 800° C.) and a high temperature (higher than 800° C.) with the lapse of time.

First, the state of the combustion in the auxiliary chamber when the auxiliary chamber temperature is low will be described. For example, the auxiliary chamber temperature is low immediately after the start of the engine 13. Therefore, the temperature of the flame generated in the auxiliary chamber 42 is insufficient, and the flame is extinguished in the auxiliary chamber 42. As described above, when the auxiliary chamber temperature is low, the ignition plug 40 is misfired or in an unstable combustion state.

Next, the state of the auxiliary chamber combustion when the auxiliary chamber temperature is middle will be described. In a case where the ignition timing is constant, the combustion timing of the air-fuel mixture also changes as the auxiliary chamber temperature increases with the lapse of time. For example, the combustion timing of the curve L11 at a relatively high temperature is different from the combustion timing of the curve L13 at a relatively low temperature. That is, it is understood that it takes more time for heat generation to occur in the main chamber 37 as the auxiliary chamber temperature becomes lower than when the auxiliary chamber temperature is high.

The reason why the main combustion timing delays as the auxiliary chamber temperature decreases is because a speed (referred to as "flame propagation speed") at which flame generated in the auxiliary chamber 42 propagates in the auxiliary chamber 42 is changed. As the auxiliary chamber temperature, the flame propagation speed increases. Thus, an ejection timing of the flame jet 44 ejected from the hole 43 to the main chamber 37 is also advanced. Meanwhile, as the auxiliary chamber temperature decreases, the flame propagation speed decreases, and the ejection timing of the flame jet 44 also decreases. Therefore, ideally, it is desirable that centroid timings of the heat generation of the curves L11 and L13 coincide with each other at a constant crank angle at which optimal fuel consumption is achieved. Therefore, the ECU 2 needs to control the ignition timing of the ignition plug 40 to be an advance angle or a retard angle so that the centroid timings of the heat generation of the curves L11 and L13 coincide with each other at a constant crank angle at which the optimal fuel consumption is achieved.

Next, the state of the auxiliary chamber combustion when the auxiliary chamber temperature is high will be described. When the auxiliary chamber temperature becomes, for example, a high temperature exceeding 800° C., the air-fuel mixture is likely to self-ignite before the electrode 41 of the ignition plug 40 performs spark discharge. When the auxiliary chamber temperature is high as described above, abnormal combustion occurs in the ignition plug 40. Therefore, if the abnormal combustion of the ignition plug 40 is not suppressed, the engine 13 is damaged. Therefore, the ignition device 50 including the auxiliary chamber 42 capable of adjusting the ignition timing of the ignition plug 40 will be described below.

Next, an internal configuration example and a functional configuration example of the ignition device 50 according to the first embodiment will be described with reference to FIGS. 6 and 7.

Figure 6:
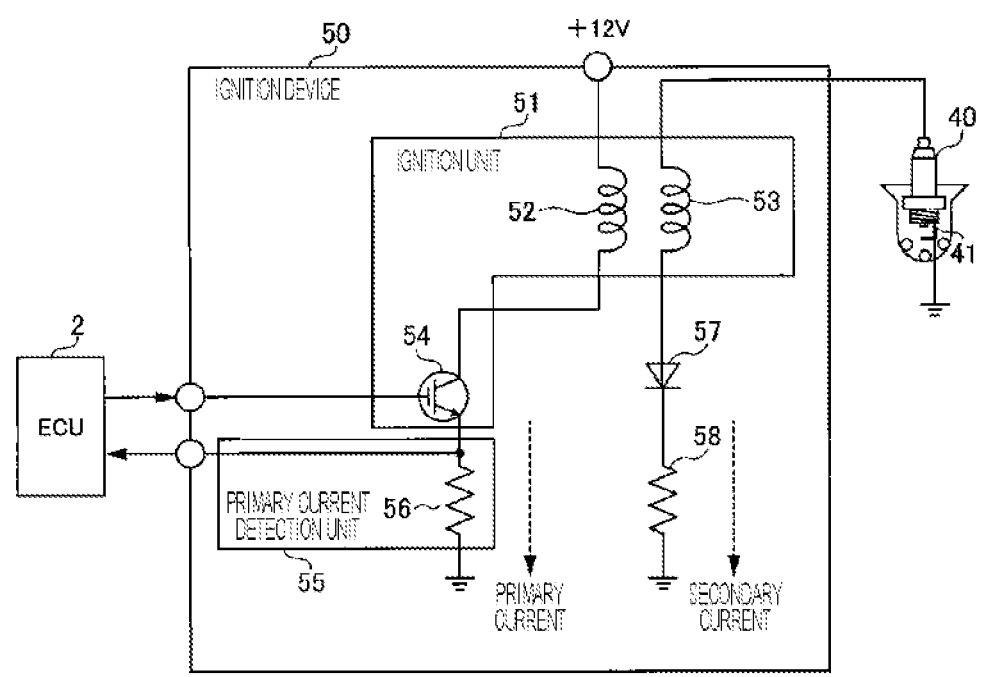
FIG. 6 is a diagram illustrating a configuration example of the ignition device according to the first embodiment of the present invention.

FIG. 6 is a diagram illustrating a configuration example of the ignition device 50.

The ignition device 50 includes an ignition unit 51, a primary current detection unit 55, a diode 57, and a resistor 58. Each unit included in the ignition device 50 is collectively disposed in a plug cap of the ignition device 50 included in each cylinder.

The ignition unit (ignition unit 51) includes a primary coil (primary coil 52) to which a primary current is applied, an igniter (igniter 54) that applies the primary current to the primary coil (primary coil 52) when the ignition control signal is turned on and cuts off the primary current when the ignition control signal is turned off, and a secondary coil (secondary coil 53) that outputs a secondary current generated when the igniter (igniter 54) in which the ignition control signal has been turned off cuts off the primary current to the electrode (electrode 41). For example, a voltage of +12 V is applied from the battery 16 to the primary coil 52, and a primary current flows. The primary coil 52 and the secondary coil 53 are an example of an ignition coil that applies a high voltage current to the ignition plug 40. In addition, a winding number ratio of the secondary coil 53 to the primary coil 52 is, for example, 100 times.

While the ignition control signal supplied from the ECU 2 to the igniter 54 is held in the on state, the primary current supplied from the battery 16 (see FIG. 1) is output from the collector of the igniter 54 to an emitter via the primary coil of the ignition unit 51. The emitter is grounded via a resistor 56 provided in the primary current detection unit 55. When the primary current detector (primary current detection unit 55) detects the primary current passed through the resistor 56, the primary current detector outputs ignition device information including a value of the primary current to the ECU 2.

Meanwhile, one end of the secondary coil 53 is connected to the electrode 41 of the ignition plug 40, and the other end of the secondary coil 53 is connected to an anode of the diode 57. A cathode of the diode 57 is grounded via the resistor 58.

When the ignition control signal supplied from the ECU 2 is turned off, the primary current flowing through the igniter 54 is cut off. At this time, a magnetic field change occurs in the primary coil 52, and a primary voltage is generated by self-induction. Furthermore, in the secondary coil 53 that shares the magnetic circuit and the magnetic flux with the primary coil 52, a high secondary voltage corresponding to the winding number ratio is generated by mutual induction. Then, the secondary voltage is applied to the electrode 41 of the ignition plug 40, and a spark discharge occurs at the electrode 41. Moreover, a secondary current generated by inducing a secondary voltage in the secondary coil 53 flows through the diode 57 and the resistor 58.

Figure 7:
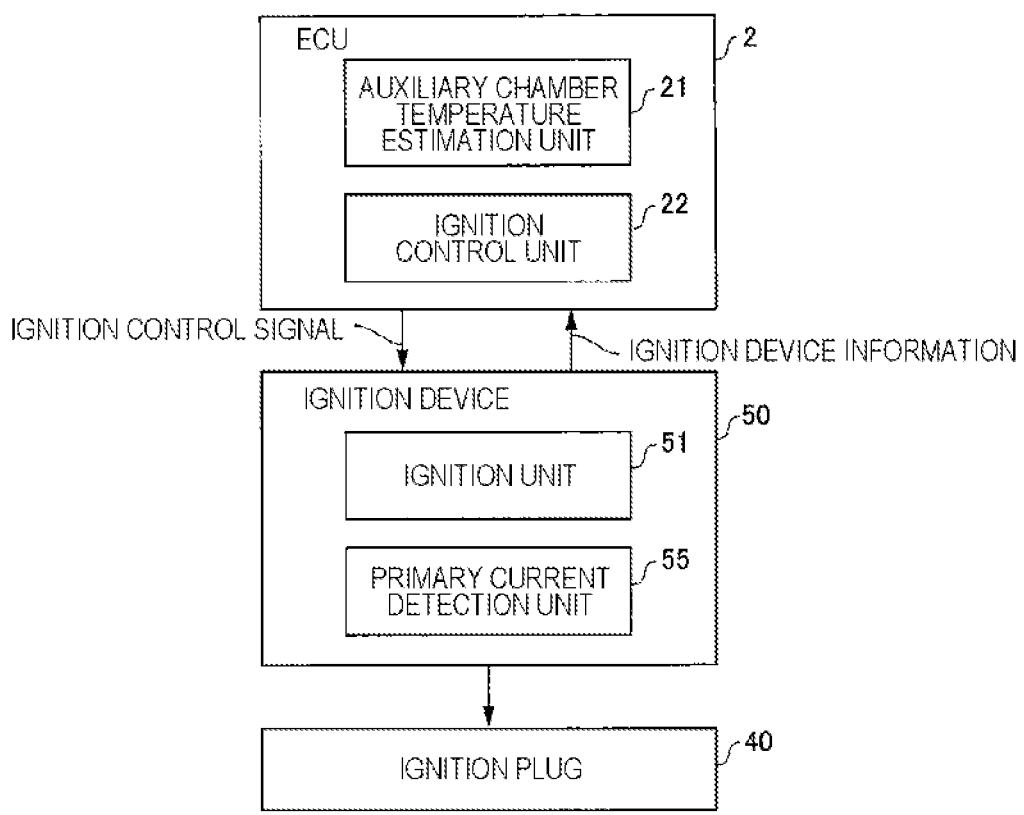
FIG. 7 is a block diagram illustrating a functional configuration example of an engine control unit (ECU) and the ignition device according to the first embodiment of the present invention.

FIG. 7 is a block diagram illustrating a functional configuration example of the ECU 2 and the ignition device 50. Here, a configuration example and an operation example of functional units included in the ECU 2 and the ignition device will be described with reference to auxiliary chamber temperatures $T_{High}$ and $T_{Low}$ illustrated in FIG. 9 as appropriate.

The ECU 2 includes an auxiliary chamber temperature estimation unit 21 and an ignition control unit 22.

The auxiliary combustion chamber temperature estimation unit (auxiliary chamber temperature estimation unit 21) estimates the temperature of the auxiliary combustion chamber (auxiliary chamber 42) based on ignition device information acquired from the ignition device (ignition device 50). The auxiliary combustion chamber temperature estimation unit (auxiliary chamber temperature estimation unit 21) estimates the temperature of the auxiliary combustion chamber (auxiliary chamber 42) based on the temporal change of the primary current in a charge period in which the primary coil (primary coil 52) is charged with energy. Here, when the ignition control signal is turned on or off, the auxiliary combustion chamber temperature estimation unit (auxiliary chamber temperature estimation unit 21) estimates the temperature of the auxiliary combustion chamber (auxiliary chamber 42) based on the change in the primary current detected by the primary current detection unit (primary current detection unit 55).

Figure 9:
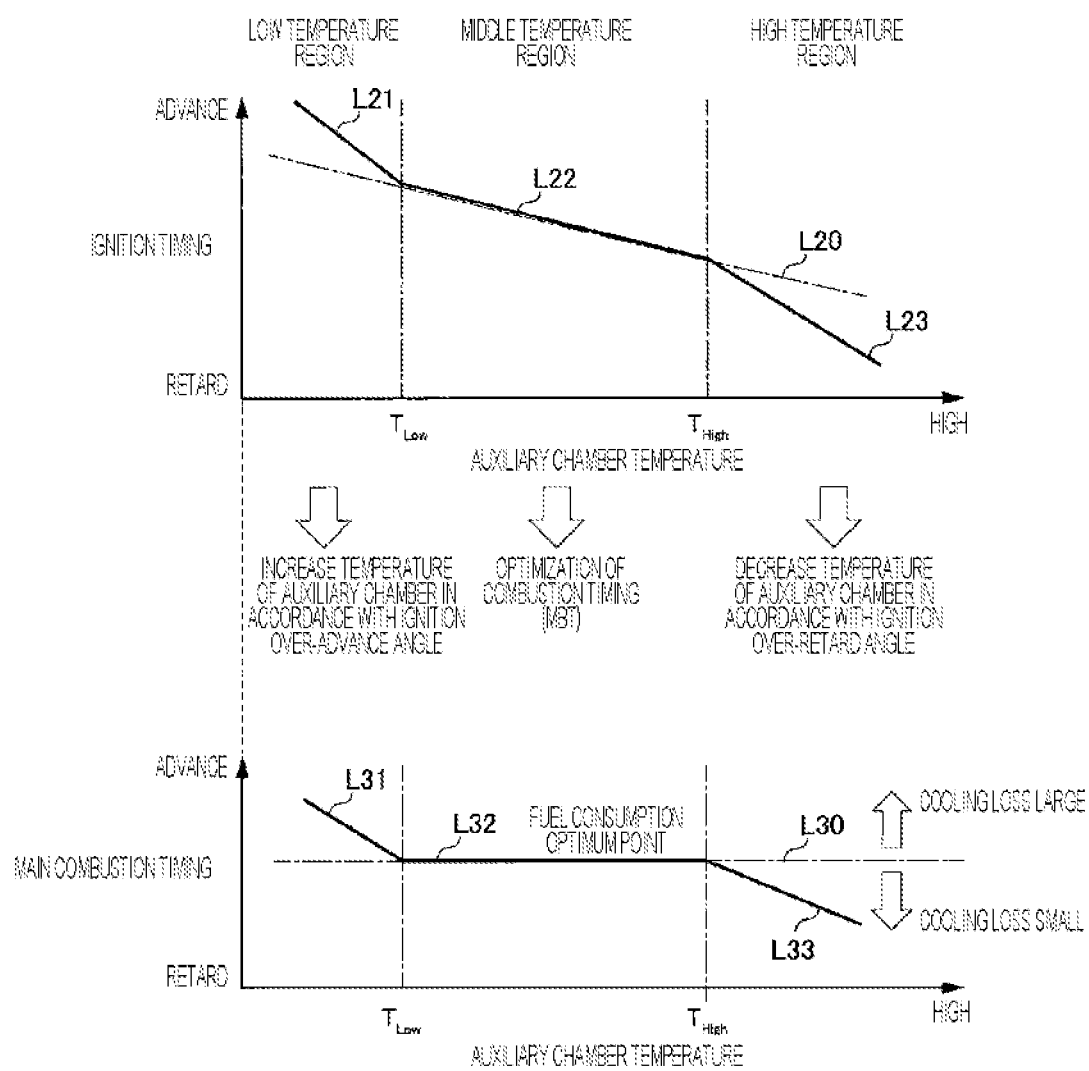
FIG. 9 is a graph illustrating a relationship between auxiliary chamber temperatures, ignition timings, and main combustion timings in a low temperature region, a middle temperature region, and a high temperature region according to the first embodiment of the present invention.

The ignition control unit (ignition control unit 22) outputs an ignition control signal for switching on/off of the igniter (igniter 54) illustrated in FIG. 6 to the ignition device (ignition device 50). With the ignition control signal, the timing at which the igniter 54 provides or cuts off the primary current is switched, and the timing at which the ignition unit 51 ignites the ignition plug 40 is controlled. Then, when the primary current is cut off, the secondary coil 53 boosts the voltage, applies a high voltage to the electrode 41 of the ignition plug 40, and a spark discharge is generated from the electrode 41. The ignition device 50 according to the present embodiment varies the ignition timing depending on whether the auxiliary chamber temperature is in a middle temperature region, a high temperature region, or a low temperature region. Therefore, as illustrated in FIG. 9, the auxiliary chamber temperature that is the boundary between the middle temperature region and the high temperature region is referred to as $T_{High}$, and the auxiliary chamber temperature that is the boundary between the low temperature region and the middle temperature region is referred to as $T_{Low}$. That is, the low temperature region is a region equal to or lower than a room temperature $T_{Low}$, the middle temperature region is a region higher than the auxiliary chamber temperature $T_{Low}$ and equal to or lower than $T_{High}$, and the high temperature region is a region higher than $T_{High}$. Here, a first set temperature (auxiliary chamber temperature $T_{High}$) is a temperature at which the air-fuel mixture starts to be ignited by pre-ignition, and is, for example, 700° C. to 800° C. The second set temperature (auxiliary chamber temperature $T_{Low}$) is a temperature at which combustion of the air-fuel mixture starts to be stabilized in the middle temperature region, and is between room temperature (20° C.) and 100° C.

Figure 8:
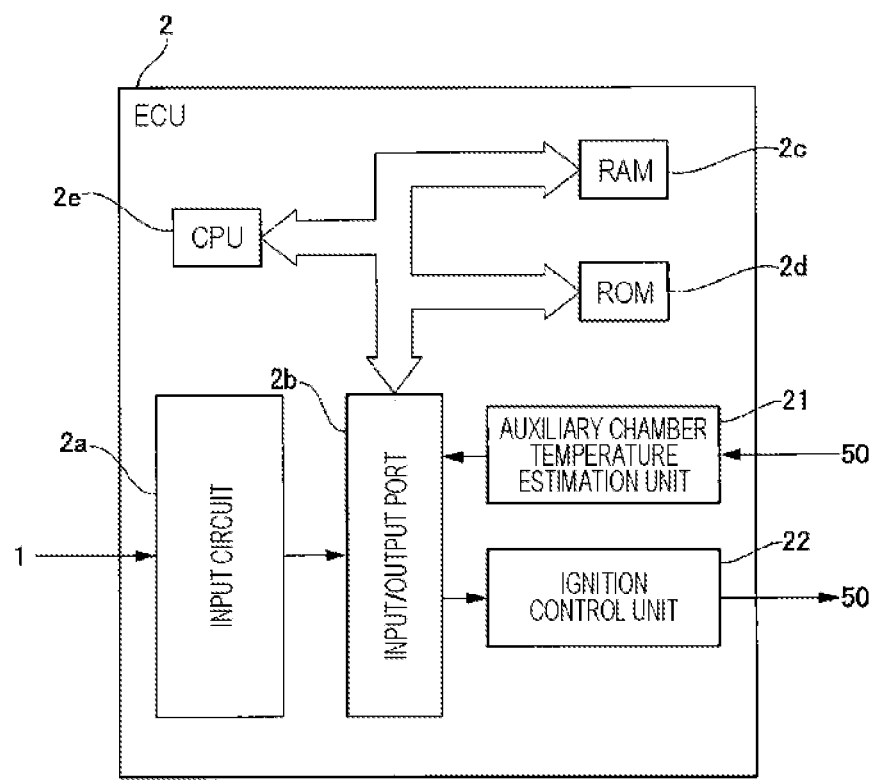
FIG. 8 is a block diagram illustrating a hardware configuration example of the ECU according to the first embodiment of the present invention.

FIG. 8 is a block diagram illustrating a hardware configuration example of the ECU 2.

The output control signal output from the engine control output unit 1f (see FIG. 2) of the VCU 1 is input to the input circuit 2a of the ECU 2. In addition, the output control signal input to the input circuit 2a is transmitted to an input port (not illustrated) in the input/output port 2b. The value transmitted to the input port is stored in the RAM 2c and is subjected to arithmetic processing by the CPU 2e. A control program describing the contents of the arithmetic processing is written in the ROM 2d in advance. Further, the ignition device information output from the ignition device 50 is input to the auxiliary chamber temperature estimation unit 21. The data of the auxiliary chamber temperature estimated by the auxiliary chamber temperature estimation unit 21 is stored in the RAM 2c in time series for each cylinder 38 of the engine 13.

Both the auxiliary chamber temperature estimation unit 21 and the ignition control unit 22 are subjected to arithmetic processing by the CPU 2e, and each function is realized. The ECU 2 also has various other functional units that control the operation of the engine 13 on the basis of the control amount detected by each sensor provided in the engine 13, but the other functional units are not illustrated here.

The value indicating the operation amount of the control target (the ignition device 50 or the like) calculated according to the control program is stored in the RAM 2c, then transmitted to an output port (not illustrated) in the input/output port 2b, and transmitted to the control target via an output unit. Here, there is the ignition control unit 22 as the output unit. The ignition control unit 22 outputs an ignition control signal to the ignition device 50.

Next, an example of ignition control of the ignition plug 40 according to a level of the auxiliary chamber temperature will be described.

FIG. 9 is a graph illustrating a relationship between the auxiliary chamber temperatures, the ignition timings, and the main combustion timings in the low temperature region, the middle temperature region, and the high temperature region.

A graph illustrating a relationship between the auxiliary chamber temperature and the ignition timing of the ignition plug 40 is illustrated on the upper side of FIG. 9. This graph is represented by the auxiliary chamber temperature on the horizontal axis and the ignition timing on the vertical axis.

In FIG. 9, a straight line L20 indicated by an alternate long and short dash line represents the ignition timing of the ignition plug 40 according to the level of the auxiliary chamber temperature determined when fuel consumption of the engine 13 is optimized. Slopes of the straight lines L21 and L22 illustrated in the drawing are changed when the auxiliary chamber temperature is $T_{Low}$, and slopes of the straight lines L22 and L20 are changed when the auxiliary chamber temperature is $T_{High}$.

In the middle temperature region, the combustion state of the ignition plug 40 is stable. Therefore, the ignition device 50 optimizes the ignition timing of the ignition plug 40 (minimum advance for the best torque (MBT)). That is, when the temperature of the auxiliary combustion chamber (auxiliary chamber 42) estimated by the auxiliary combustion chamber temperature estimation unit (auxiliary chamber temperature estimation unit 21) is included in the middle temperature region equal to or lower than the first set temperature, the ignition control unit (ignition control unit 22) delays the ignition timing at a first decrease degree defined in accordance with the change amount of the ignition timing with respect to the temperature of the auxiliary combustion chamber (auxiliary chamber 42) as the temperature of the auxiliary combustion chamber (auxiliary chamber 42) increases. Here, when the temperature of the auxiliary combustion chamber (auxiliary chamber 42) is included in the middle temperature region, the ignition control unit (ignition control unit 22) determines the first decrease degree in accordance with the ignition timing at which the internal combustion engine generates the maximum torque. At this time, the straight line L22 representing the control state of the ignition timing according to the present embodiment substantially coincides with the straight line L20 that optimizes the fuel consumption of the engine 13.

As illustrated in FIG. 5, in the high temperature region, the air-fuel mixture is likely to self-ignite before ignition by the ignition plug 40. Therefore, the ignition device 50 delays the ignition timing of the ignition plug 40 as an over-retard angle (referred to as "ignition over-retard angle") indicated by the straight line L23 as compared with the conventional retard angle indicated by the straight line L20 and performs control to decrease the temperature of the auxiliary chamber 42. That is, when the temperature of the auxiliary combustion chamber (auxiliary chamber 42) is included in the high temperature region higher than the first set temperature, the ignition control unit (ignition control unit 22) delays the ignition timing at a second decrease degree larger than the first decrease degree as the temperature of the auxiliary combustion chamber (auxiliary chamber 42) increases. By this control, the auxiliary chamber temperature decreases, and self-ignition (pre-ignition) of the air-fuel mixture can be avoided.

In addition, as illustrated in FIG. 5, in the low temperature region, the combustion state of the ignition plug 40 tends to be unstable. Therefore, the ignition device 50 advances the ignition timing of the ignition plug 40 as an over-advance angle (referred to as "ignition over-advance angle") indicated by the straight line L21, rather than the conventional advance angle indicated by the straight line L20, and performs control to increase the temperature of the auxiliary chamber 42. Conversely, when the temperature of the auxiliary combustion chamber (auxiliary chamber 42) is included in the low temperature region that is equal to or lower than the second set temperature that is the lower limit of the middle temperature region, the ignition control unit (ignition control unit 22) delays the ignition timing at a third decrease degree larger than the first decrease degree as the temperature of the auxiliary combustion chamber (auxiliary chamber 42) increases. By this control, the auxiliary chamber temperature increases, and misfire and incomplete combustion of the air-fuel mixture can be avoided.

A graph illustrating a relationship between the auxiliary chamber temperature and the main combustion timing is illustrated on the lower side of FIG. 9. In this graph, the horizontal axis represents the auxiliary chamber temperature, and the vertical axis represents the main combustion timing. In FIG. 9, a straight line L30 indicated by an alternate long and short dash line represents the main combustion timing of the ignition plug 40 according to the level of the auxiliary chamber temperature, which is determined based on the fuel consumption optimum point that optimizes the fuel consumption of the engine 13, similarly to the straight line L20. Slopes of the straight lines L31 and L32 illustrated in the drawing are changed when the auxiliary chamber temperature is $T_{Low}$, and slopes of the straight lines L32 and L30 are changed when the auxiliary chamber temperature is $T_{High}$.

In the low temperature region where the state of the combustion in the auxiliary chamber tends to be unstable, the ignition device 50 advances the main combustion timing as indicated by a straight line L31 from the conventional timing indicated by a straight line L30. Therefore, the temperature of the auxiliary chamber 42 of the ignition plug 40 in a state where the auxiliary chamber temperature is in the low temperature region and a cooling loss is large is quickly raised, and the auxiliary chamber temperature is easily raised. That is, the auxiliary chamber 42 can be warmed more quickly than in that of the related art, and the cooling loss can be suppressed.

In the middle temperature region, the combustion state of the ignition plug 40 is stable. Therefore, the straight line L32 representing the state of the main combustion timing of the ignition plug 40 according to the present embodiment coincides with the straight line L30 representing the fuel consumption optimum point.

In a high temperature region where the air-fuel mixture is likely to self-ignite before ignition by the ignition plug 40, the ignition device 50 delays the main combustion timing as indicated by the straight line L33 as compared with the conventional timing indicated by the straight line L30. Therefore, the temperature of the auxiliary chamber 42 of the ignition plug 40 in a state where the auxiliary chamber temperature is in the high temperature region and the cooling loss is small quickly decreases, and the auxiliary chamber temperature easily decreases. That is, by increasing the cooling loss, the auxiliary chamber 42 is cooled faster than in that of the related art.

Figure 10:
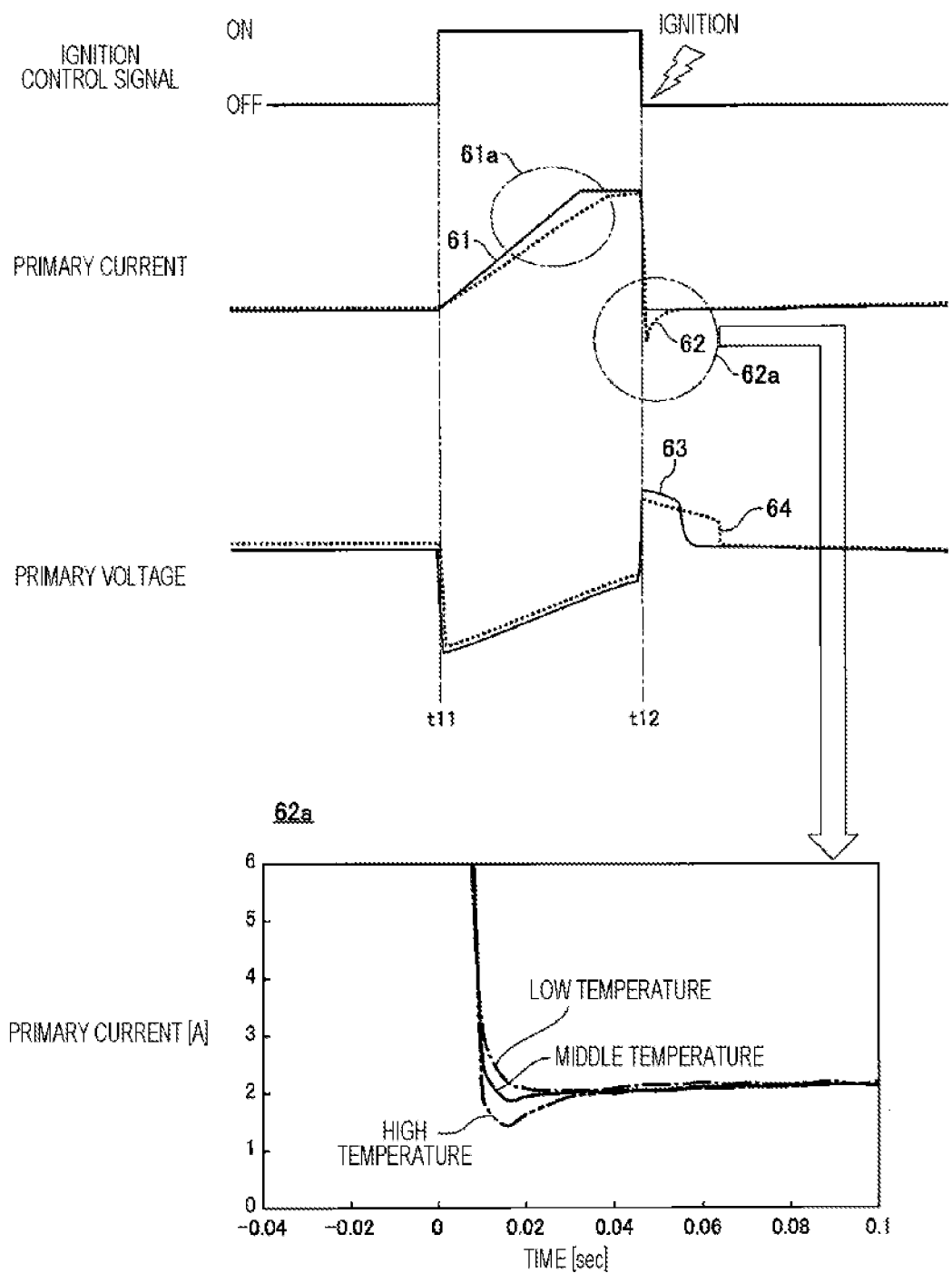
FIG. 10 is a graph illustrating changes in an ignition control signal, a primary current, and a primary voltage according to the first embodiment of the present invention.

FIG. 10 is a graph illustrating changes in the ignition control signal, the primary current, and the primary voltage.

Here, a description will be given with reference to a circuit diagram of the ignition device 50 illustrated in FIG. 6.

On the upper side of FIG. 10, the timing at which the ignition control unit 22 turns the ignition control signal from off to on and then turns it off again is illustrated. It is illustrated in the figure that the ignition plug 40 ignites when the ignition control signal is turned off.

On the middle side of FIG. 10, a graph of a current waveform obtained by the primary current detection unit 55 detecting the primary current of the ignition plug 40 and a voltage waveform of the primary voltage is illustrated. In a graph 61 of the primary current, a change in the primary current when the auxiliary chamber temperature is low is represented by a solid line, and in a graph 62, a change in the primary current when the auxiliary chamber temperature is high is represented by a broken line. The auxiliary chamber temperature estimation unit 21 that has received the ignition device information including the value of the primary current detected by the primary current detection unit 55 determines the temporal changes in the primary current and the primary voltage.

As illustrated in the current waveform of the primary current, when the auxiliary chamber temperature is low, the coil resistance of the primary coil 52 is low, and thus, the primary current easily flows through the primary coil 52. For this reason, the time required from when the ignition control signal is turned on at time t11 until the primary coil 52 is charged with the energy of the primary current is short, and the gradient of the primary current is steep as illustrated as a region 61a in the drawing. Meanwhile, when the auxiliary chamber temperature becomes high, the coil resistance of the primary coil 52 increases, and the primary current hardly flows through the primary coil 52. Therefore, the time required from when the ignition control signal is turned on at the time t11 to when the energy of the primary current is charged into the primary coil 52 becomes long, and the gradient of the primary current is moderated.

In addition, when the auxiliary chamber temperature is low, as illustrated as a region 62a in FIG. 10, when the ignition control signal is changed to OFF at time t12, the value of the primary current immediately returns to the same value as before the ignition control signal is turned on. Meanwhile, when the auxiliary chamber temperature increases, the inductance of the primary coil 52 increases, and the undershoot amount of the primary current also increases.

Therefore, the auxiliary combustion chamber temperature estimation unit (auxiliary chamber temperature estimation unit 21) estimates the temperature of the auxiliary combustion chamber (auxiliary chamber 42) based on the fact that the increase amount per unit time of the primary current flowing when the ignition control signal is turned on is smaller than the increase amount per unit time of the primary current in the low temperature region. Then, the ignition control unit (ignition control unit 22) delays the ignition timing based on the estimated temperature of the auxiliary combustion chamber (auxiliary chamber 42).

On the lower side of FIG. 10, an enlarged view of the region 62a of FIG. 10 is illustrated. This enlarged view illustrates a state in which the primary current that appears when the auxiliary chamber temperature is low, middle, or high changes with time. From FIG. 10, it can be seen that as the auxiliary chamber temperature increases, the undershoot amount of the primary current increases, and it takes time for the value of the primary current to return to the same value as before the ignition control signal is turned on.

Therefore, the auxiliary combustion chamber temperature estimation unit (auxiliary chamber temperature estimation unit 21) estimates the temperature of the auxiliary combustion chamber (auxiliary chamber 42) based on the undershoot amount when the ignition control signal is turned off and the primary current returns to the value before the ignition control signal is turned on. Then, the ignition control unit (ignition control unit 22) delays the ignition timing based on the estimated temperature of the auxiliary combustion chamber (auxiliary chamber 42). As illustrated in FIG. 10, since the undershoot amount of the primary current greatly changes as the auxiliary chamber temperature increases, the auxiliary chamber temperature estimation unit 21 can estimate the auxiliary chamber temperature according to the undershoot amount.

In a graph 63 of the primary voltage illustrated in the middle of FIG. 10, the change in the primary voltage when the auxiliary chamber temperature is low is represented by a solid line, and in the graph 64, the change in the primary voltage when the auxiliary chamber temperature is high is represented by a broken line. In addition, as illustrated in the voltage waveform of the primary voltage, the primary voltage from when the ignition control signal is turned on at the time t11 to when the energy of the primary current is charged to the primary coil is changed in the same manner when the auxiliary chamber temperature is low and when the auxiliary chamber temperature is high.

However, at the timing when the ignition control signal is turned off at time the t12, the primary voltage with the lower auxiliary chamber temperature is changed to be higher than the primary voltage with the higher auxiliary chamber temperature.

Thereafter, the time during which the primary voltage returns to the value before the ignition control signal is turned on when the auxiliary chamber temperature is high is longer than the time during which the primary voltage returns to the original value when the auxiliary chamber temperature is low. Therefore, the auxiliary chamber temperature estimation unit 21 can determine whether the auxiliary chamber temperature is in the low temperature region or the high temperature region by converting the primary current detected by the primary current detection unit 55 into the primary voltage and obtaining the change in the primary voltage.

Then, the auxiliary combustion chamber temperature estimation unit (auxiliary chamber temperature estimation unit 21) estimates the temperature of the auxiliary combustion chamber (auxiliary chamber 42) based on the fact that a time, until the primary voltage applied to the primary coil (primary coil 52) when the ignition control signal is turned off returns to a value before the ignition control signal is turned on, increases. Then, the ignition control unit (ignition control unit 22) delays the ignition timing based on the estimated temperature of the auxiliary combustion chamber (auxiliary chamber 42).

Here, a control in which the ignition control unit 22 changes the ignition timing to the retard angle to lower the auxiliary chamber temperature will be described with reference to FIG. 11.

Figure 11:
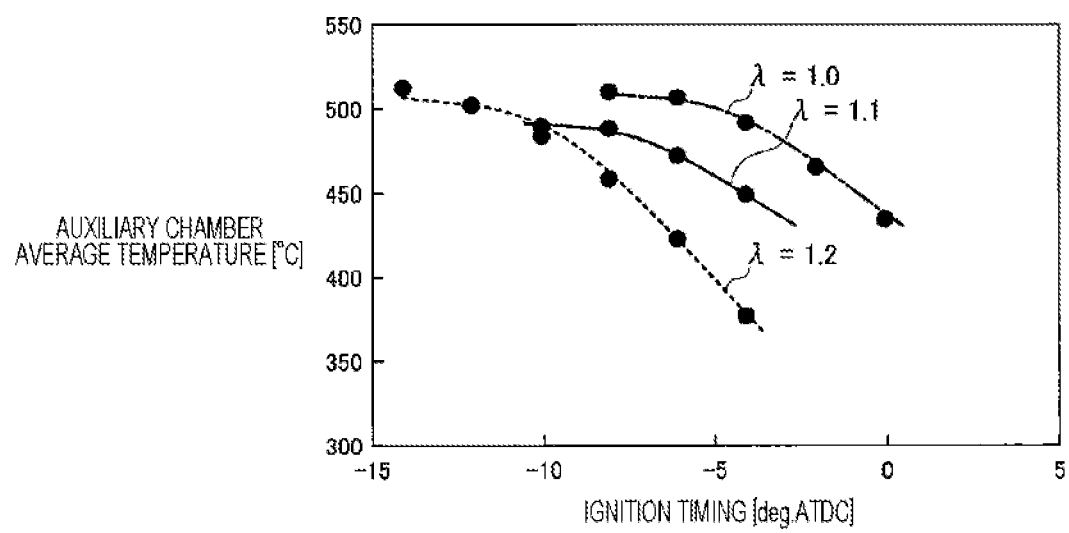
FIG. 11 is a graph illustrating a relationship between the ignition timing and an auxiliary chamber average temperature according to the first embodiment of the present invention.

FIG. 11 is a graph illustrating a relationship between the ignition timing and an auxiliary chamber average temperature. This graph is represented by the ignition timing [deg.ATDC] on a horizontal axis and the auxiliary chamber average temperature [° C.] on a vertical axis. A top dead center (TDC) of the compression stroke is set to 0 deg. In addition, A in the drawing represents an excess air ratio. In general, an air-fuel mixture of $\lambda=1$ represents a theoretical air-fuel mixture, an air-fuel mixture of λ>1 represents a lean air-fuel mixture, and an air-fuel mixture of λ<1 represents a rich air-fuel mixture.

As illustrated in the drawing, as the excess air ratio λ increases to 1.0, 1.1, and 1.2, the decrease amount of the auxiliary chamber average temperature when the ignition timing becomes the retard angle increases. Therefore, the ignition control unit 22 of the ECU 2 (see FIG. 7) can control to decrease the high auxiliary chamber temperature by changing the ignition timing to the retard angle (for example, the ignition timing is changed from −10 deg to −5 deg.).

<Example of Process of Changing Ignition Timing>

Here, an example of a process in which the ignition control unit 22 controls the operation of the ignition unit 51 of the ignition device 50 to change the ignition timing when the auxiliary chamber temperature is low or high will be described with reference to FIGS. 12 to 15.

(Example of Processing When auxiliary chamber Temperature is Low)

Figure 12:
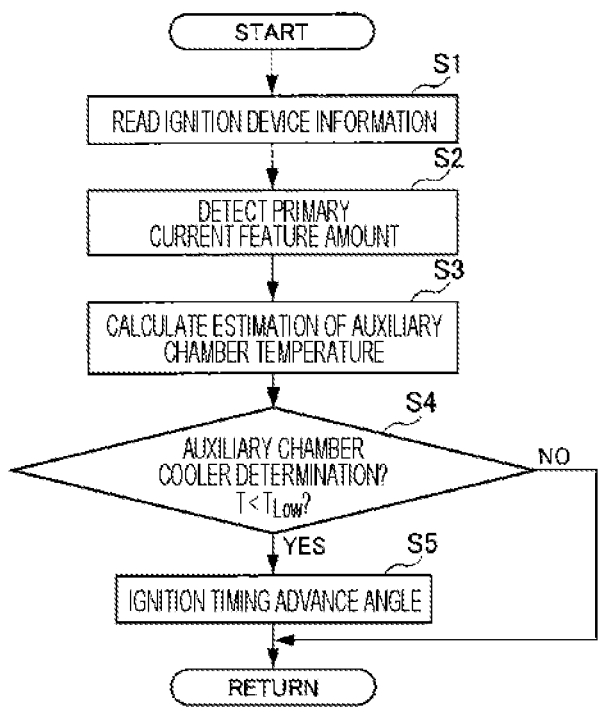
FIG. 12 is a flowchart illustrating an example of control in which an ignition control unit changes the ignition timing to an advance angle when an auxiliary chamber temperature is low according to the first embodiment of the present invention.

FIG. 12 is a flowchart illustrating an example of a control in which the ignition control unit 22 changes the ignition timing to the advance angle when the auxiliary chamber temperature is low.

Figure 13:
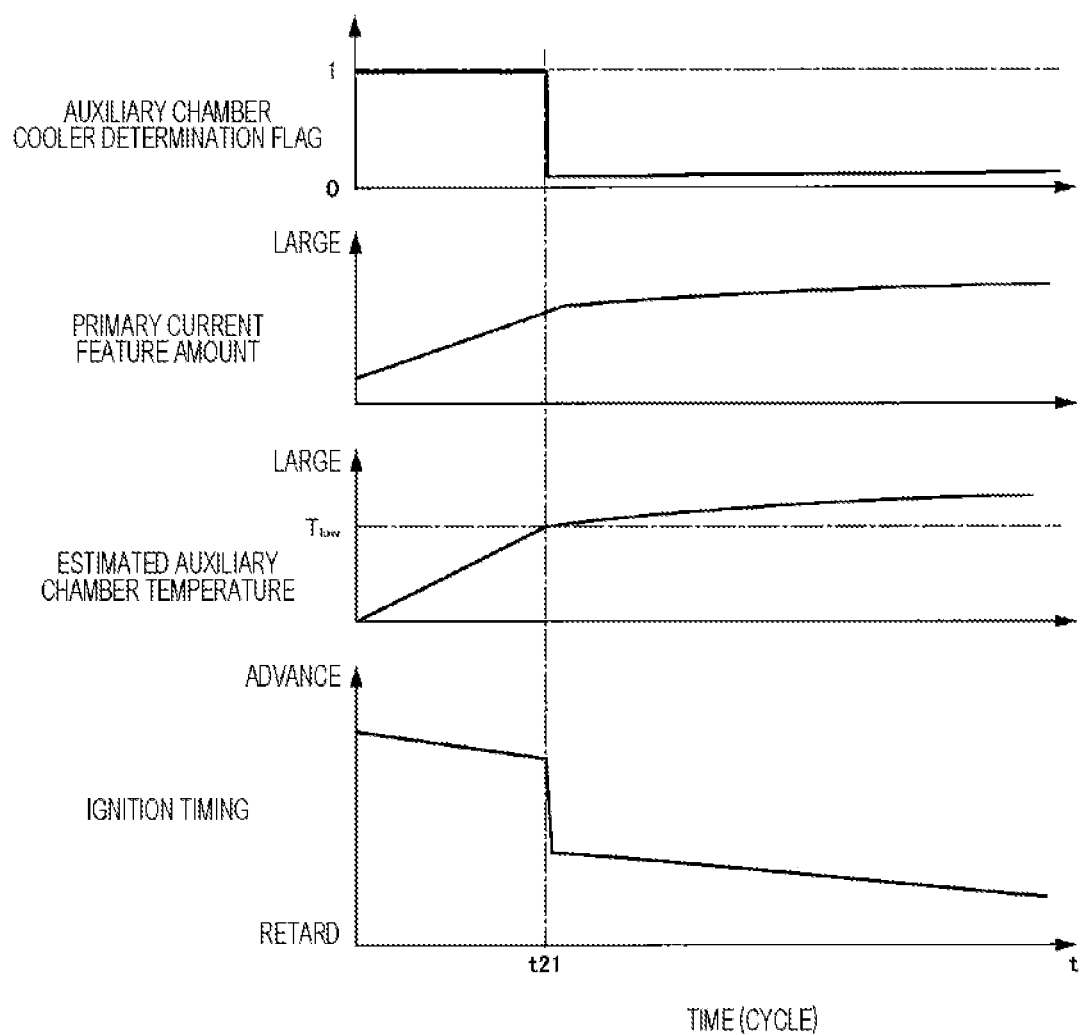
FIG. 13 is a graph illustrating a timing at which the ignition control unit adjusts the ignition timing when the auxiliary chamber temperature is low according to the first embodiment of the present invention.

FIG. 13 is a graph illustrating timing at which the ignition control unit 22 adjusts the ignition timing when the auxiliary chamber temperature is low. In this graph, a horizontal axis represents a time (cycle), and a vertical axis represents an auxiliary chamber cooler determination flag, a primary current feature amount, an estimated auxiliary chamber temperature, and the ignition timing.

First, the auxiliary chamber temperature estimation unit 21 reads ignition device information output from the ignition device 50 (S1).

The ignition device information includes, for example, a value of the primary current detected by the primary current detection unit 55. At this time, as illustrated in FIG. 13, the auxiliary chamber cooler determination flag is set to "1".

Next, the auxiliary chamber temperature estimation unit 21 detects a feature amount of the primary current (referred to as "primary current feature amount") based on the read ignition device information (S2).

The primary current feature amount is a physical amount substantially indicating a value of the primary current. As illustrated in FIG. 13, the primary current feature amount increases with the lapse of time.

Next, the auxiliary chamber temperature estimation unit 21 performs calculation processing of estimating the auxiliary chamber temperature based on the primary current feature amount (S3). As illustrated in FIG. 13, as the primary current feature amount increases, the auxiliary chamber temperature (referred to as "estimated auxiliary chamber temperature") estimated by the auxiliary chamber temperature estimation unit 21 also increases. Then, the auxiliary chamber temperature estimation unit 21 outputs the estimated auxiliary chamber temperature to the ignition control unit 22.

Next, the ignition control unit 22 determines whether or not the auxiliary chamber 42 is in a cooling state. This determination is made based on whether or not the estimated auxiliary chamber temperature is smaller than the temperature threshold $T_{Low}$ (S4). When the estimated auxiliary chamber temperature is smaller than the temperature threshold $T_{Low}$ at the time t21 (YES in S4), the ignition control unit 22 determines that the auxiliary chamber 42 is in the cooling state, sets the auxiliary chamber cooler determination flag to "1", and performs control to advance the ignition timing of the ignition plug 40 (S5). Then, after Step S5, the process returns to S1 again, and the auxiliary chamber temperature estimation unit 21 and the ignition control unit 22 repeat this process.

In this manner, the ignition control unit 22 can quickly raise the temperature of the auxiliary chamber 42. However, as illustrated in FIG. 9, when the auxiliary chamber temperature is in the low temperature region and the auxiliary chamber temperature has increased, the ignition control unit 22 delays the ignition timing that has been the advance angle at the third decrease degree according to the lapse of time.

Meanwhile, after the time t21, the estimated auxiliary chamber temperature becomes higher than the temperature threshold $T_{Low}$ (NO in S4). At this time, the ignition control unit 22 determines that the auxiliary chamber 42 is not in the cooling state, and ends the process without changing the ignition timing of the ignition plug 40.

When the primary current increases, the estimated auxiliary chamber temperature calculated by the auxiliary chamber temperature estimation unit 21 also increases. When the estimated auxiliary chamber temperature becomes equal to or higher than the temperature threshold $T_{Low}$, the auxiliary chamber 42 is not in the cooling state and reaches the middle temperature region. Therefore, the ignition control unit 22 changes the auxiliary chamber cooler determination flag to "0" and delays the ignition timing.

(Example of Process When Auxiliary Chamber Temperature is High)

Figure 14:
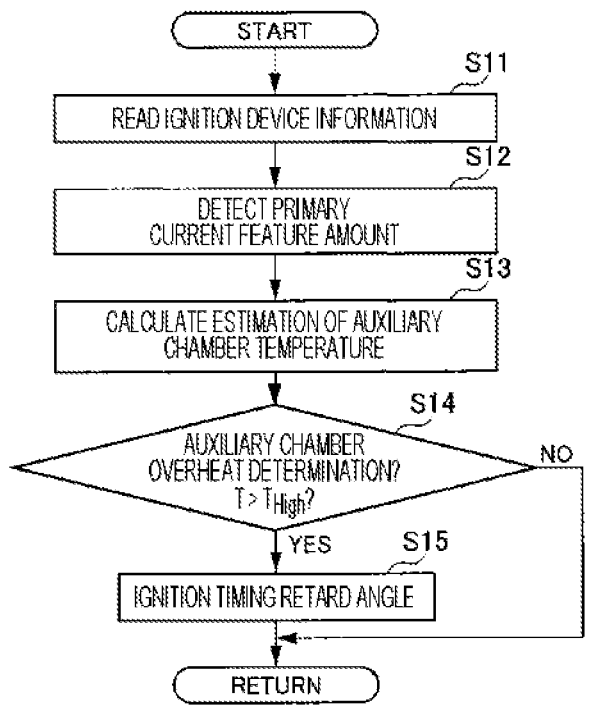
FIG. 14 is a flowchart illustrating an example of control in which the ignition control unit changes the ignition timing to a retard angle when the auxiliary chamber temperature is high according to the first embodiment of the present invention.

FIG. 14 is a flowchart illustrating an example of control in which the ignition control unit 22 changes the ignition timing to the retard angle when the auxiliary chamber temperature is high.

Figure 15:
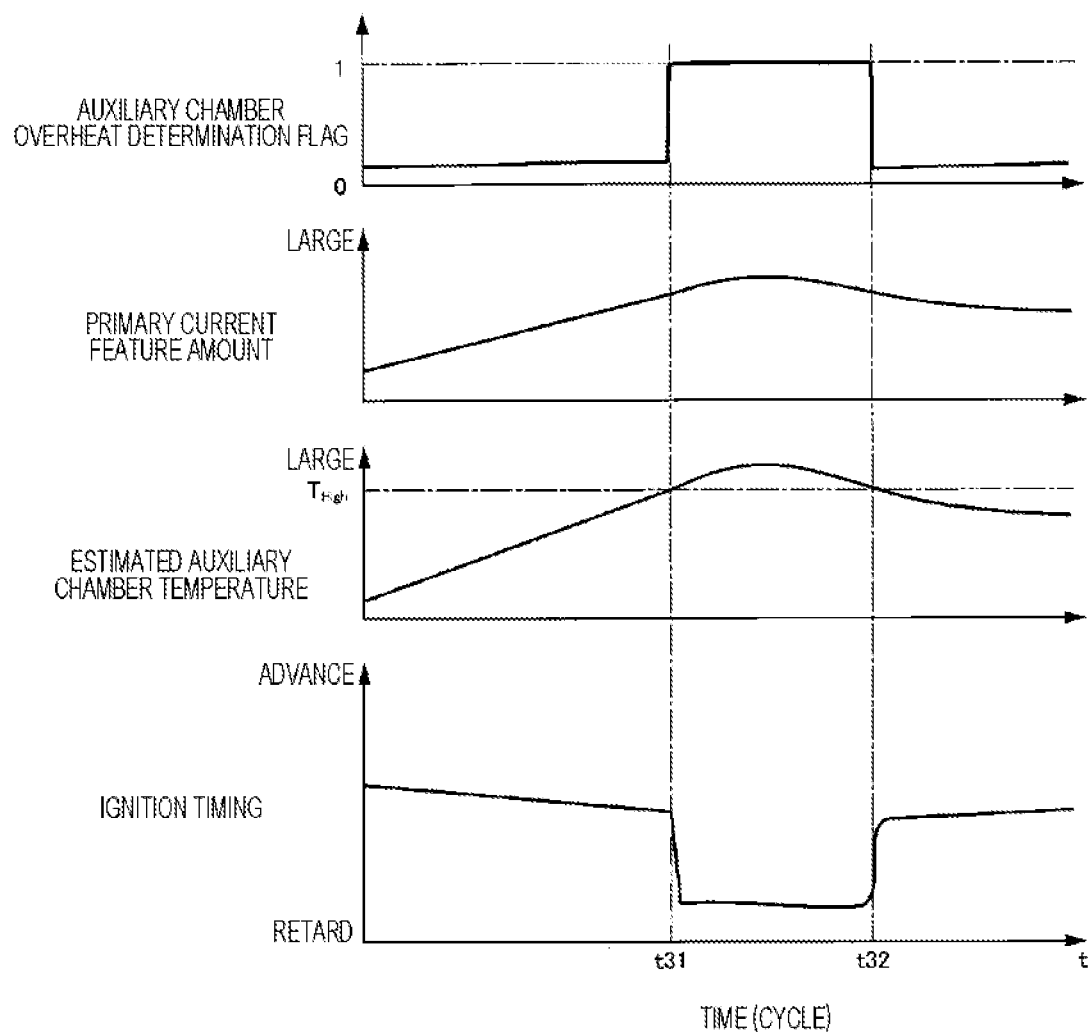
FIG. 15 is a graph illustrating a timing at which the ignition control unit adjusts the ignition timing when the auxiliary chamber temperature is high according to the first embodiment of the present invention.

FIG. 15 is a graph illustrating a timing at which the ignition control unit 22 adjusts the ignition timing when the auxiliary chamber temperature is high. This graph is represented by time (cycle) on a horizontal axis, an auxiliary chamber overheat determination flag, the primary current feature amount, the estimated auxiliary chamber temperature, and ignition timing on a vertical axis.

First, the auxiliary chamber temperature estimation unit 21 reads ignition device information output from the ignition device 50 (S11). At this time, as illustrated in FIG. 15, the auxiliary chamber overheat determination flag is in a "0" state.

Next, the auxiliary chamber temperature estimation unit 21 detects the primary current feature amount based on the read change in the ignition device information (S12). As illustrated in FIG. 15, as the primary current increases, the primary current feature amount increases. However, since the auxiliary chamber temperature is high, a rate of increase in the primary current feature amount is slower than a rate of increase when the auxiliary chamber temperature is low illustrated in FIG. 13.

Next, the auxiliary chamber temperature estimation unit 21 performs calculation processing of estimating the auxiliary chamber temperature based on the primary current feature amount (S13). As illustrated in FIG. 15, as the primary current feature amount increases, the estimated auxiliary chamber temperature also increases. Then, the auxiliary chamber temperature estimation unit 21 outputs the estimated auxiliary chamber temperature to the ignition control unit 22.

Next, the ignition control unit 22 determines whether or not the estimated auxiliary chamber temperature is in the overheat state. This determination is made based on whether or not the estimated auxiliary chamber temperature is larger than the temperature threshold $T_{High}$ (S14). When the estimated auxiliary chamber temperature becomes larger than the temperature threshold $T_{High}$ at time t31 (YES in S14), the ignition control unit 22 changes the auxiliary chamber overheat determination flag to "1" and sets the ignition timing of the ignition plug 40 to the retard angle (S15). Then, after Step S15, the process returns to Step S11 again, and the auxiliary chamber temperature estimation unit 21 and the ignition control unit 22 repeat this process. Therefore, the auxiliary chamber temperature decreases, and the auxiliary chamber temperature becomes equal to or lower than the temperature threshold $T_{High}$ at the time t32.

Meanwhile, when the estimated auxiliary chamber temperature is equal to or lower than the temperature threshold $T_{High}$ (NO in S14), the ignition control unit 22 does not change the ignition timing, and returns to S11 again to repeat the present processing. Therefore, overheating of the auxiliary chamber temperature is prevented. However, as illustrated in FIG. 9, when the auxiliary chamber temperature is in the high temperature region, the ignition control unit 22 further delays the ignition timing that has been the retard angle at the first decrease degree with the lapse of time.

When the primary current feature amount starts to decrease, the estimated auxiliary chamber temperature calculated by the auxiliary chamber temperature estimation unit 21 also decreases. Then, when the estimated auxiliary chamber temperature becomes equal to or lower than the temperature threshold $T_{High}$ at the time t32, the ignition control unit 22 changes the auxiliary chamber overheat determination flag to "0" and returns the ignition timing to the original state.

In the ECU 2 according to the first embodiment described above, it is possible to estimate the auxiliary chamber temperature and adjust the ignition timing of the ignition plug 40 without providing a new sensor for the ignition plug 40 attached to the auxiliary chamber 42 formed by the auxiliary chamber forming member 45. Here, when the auxiliary chamber temperature is in the low temperature region, the ignition control unit 22 sets the ignition timing of the ignition plug 40 to the advance angle to raise the temperature of the auxiliary chamber 42 earlier. For this reason, misfire and incomplete combustion that may occur due to the low auxiliary chamber temperature are prevented. When the auxiliary chamber temperature is in the high temperature region, the ignition control unit 22 sets the ignition timing of the ignition plug 40 to the retard angle to lower the auxiliary chamber temperature. Therefore, abnormal combustion such as knock that may occur due to overheating of the ignition plug 40 is prevented. By adjusting the ignition timing of the ignition plug 40 in this manner, it is possible to stabilize the combustion state of flame generated by spark discharge of the ignition plug 40 not only when the engine 13 is overloaded but also when the engine 13 is under low load immediately after starting.

Here, the auxiliary chamber temperature estimation unit 21 calculates the estimated auxiliary chamber temperature based on the primary current feature amount of the primary current detected by the primary current detection unit 55. Therefore, it is not necessary to provide a new temperature sensor for detecting the auxiliary chamber temperature in the auxiliary chamber 42, and thus, the configuration of the ignition plug 40 can be simplified and the production cost can be suppressed. In addition, by using the primary current or the primary voltage as the measurement target, it is possible to estimate the auxiliary chamber temperature while suppressing the influence of the spark discharge of the ignition plug 40.

Second Embodiment

Next, a configuration example of an ignition device according to a second embodiment of the present invention will be described with reference to FIGS. 16 and 17.

Figure 16:
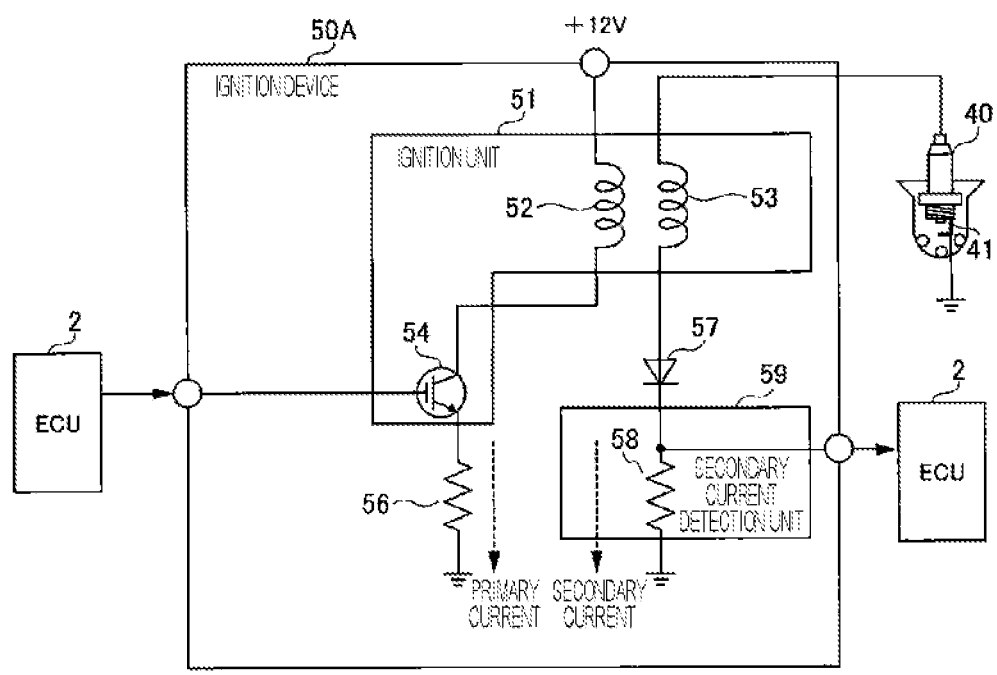
FIG. 16 is a diagram illustrating a configuration example of an ignition device according to a second embodiment of the present invention.

FIG. 16 is an explanatory diagram illustrating a configuration example of an ignition device 50A.

The ignition device 50A includes an ignition unit 51, a resistor 56, a diode 57, and a secondary current detection unit 59. Although a block diagram of the ignition device 50A is not illustrated, the primary current detection unit 55 is replaced with the secondary current detection unit 59 from the block diagram of the ignition device 50 illustrated in FIG. 7.

The ignition device 50A includes, instead of the primary current detection unit 55 included in the ignition device 50, the secondary current detection unit (secondary current detection unit 59) that detects a secondary current and outputs ignition device information including a value of the secondary current to the auxiliary combustion chamber temperature estimation unit (auxiliary chamber temperature estimation unit 21), and the secondary current detection unit 59 detects the secondary current flowing through the resistor 58. Then, the auxiliary combustion chamber temperature estimation unit (auxiliary chamber temperature estimation unit 21) estimates the temperature of the auxiliary combustion chamber (auxiliary chamber 42) based on the change in the secondary current acquired from the ignition device information.

Figure 17:
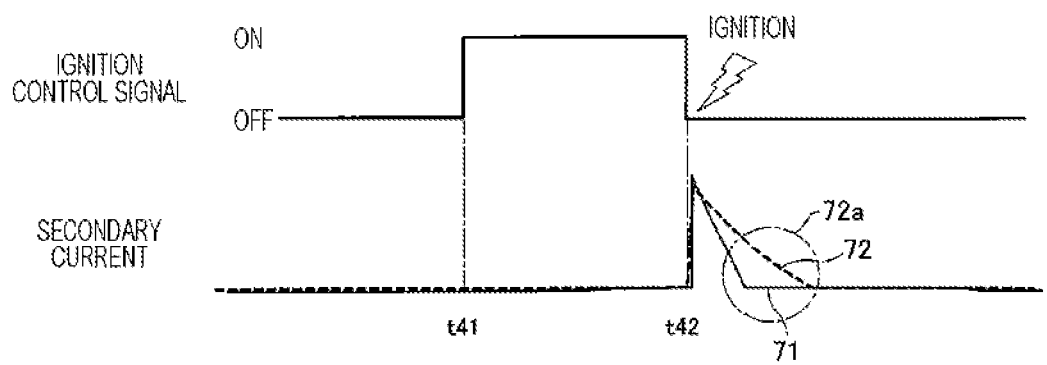
FIG. 17 is a graph illustrating changes in an ignition control signal and a secondary current according to the second embodiment of the present invention.

FIG. 17 is a graph illustrating changes in the ignition control signal and the secondary current. As described above, the ignition control signal is output from the ignition device 50A to the ignition plug 40, and the ignition control unit 22 that has received the current information of the secondary current detected by the secondary current detection unit 59 determines the temporal change of the secondary current.

The timing at which the ignition control unit 22 turns the ignition control signal from off to on and then turns it off again is illustrated on the upper side of FIG. 17. In the drawing, it is illustrated that the ignition plug 40 ignites at the timing when the ignition control signal is turned off.

On the lower side of FIG. 17, a graph of a current waveform obtained by the secondary current detection unit 59 detecting the secondary current of the ignition plug 40 is illustrated. In a graph 71 of the secondary current, a change in the secondary current when the auxiliary chamber temperature is low is represented by a solid line, and in a graph 72, a change in the secondary current when the auxiliary chamber temperature is high is represented by a broken line. The operation of each unit will be described with reference to a circuit diagram of the ignition device 50A illustrated in FIG. 16.

For example, when the auxiliary chamber temperature is low, the resistance of the secondary coil 53 itself is low, and thus, the secondary current easily flows through the secondary coil 53. Therefore, the secondary current does not change while the primary current flows from the collector to the emitter of the igniter 54 after the ignition control signal is turned on in the ignition device 50A at time t41. Thereafter, when the ignition control signal is turned off at time t42, the secondary current flows through the secondary coil 53 at once as indicated by a region 72a in the drawing.

When the auxiliary chamber temperature is low, since the resistance of the secondary coil 53 is small, the time during which the secondary current flowing through the secondary coil 53 flows to the ignition plug 40 is short, and the gradient of the secondary current is steep, and thus, the value of the secondary current immediately returns to the original value. Meanwhile, when the auxiliary chamber temperature becomes high, the resistance of the secondary coil 53 itself and the resistance of the electrode 41 increase, and the secondary current hardly flows through the ignition plug 40. Therefore, since the time during which the secondary current flows to the ignition plug 40 becomes long after the ignition control signal is turned off, the gradient of the secondary current is moderated. As described above, when the auxiliary chamber temperature is included in either the low temperature region or the high temperature region, the graph of the secondary current appearing when the ignition control signal is turned off changes.

Therefore, the auxiliary combustion chamber temperature estimation unit (auxiliary chamber temperature estimation unit 21) estimates the temperature of the auxiliary combustion chamber (auxiliary chamber 42) based on the fact that a time, until the secondary current that increases when the ignition control signal is turned off decreases and returns to a value before the ignition control signal is turned on, increases. Then, the ignition control unit (ignition control unit 22) delays the ignition timing based on the estimated temperature of the auxiliary combustion chamber (auxiliary chamber 42).

In the ignition device 50A according to the second embodiment described above, current information of the secondary current detected by the secondary current detection unit 59 is output to the ECU 2. Then, the auxiliary chamber temperature estimation unit 21 of the ECU 2 estimates the auxiliary chamber temperature on the basis of the current information of the secondary current input from the ignition device 50A, and the ignition control unit 22 can change the ignition timing of the ignition plug 40 in accordance with the estimated auxiliary chamber temperature.

Note that an ignition device including the primary current detection unit 55 of the ignition device 50 according to the first embodiment and the secondary current detection unit 59 of the ignition device 50A according to the second embodiment may be provided. Then, the auxiliary chamber temperature estimation unit 21 of the ECU 2 may estimate the auxiliary chamber temperature on the basis of the current information of the detected primary current and secondary current, and the ignition control unit 22 may change the ignition timing of the ignition plug 40 in accordance with the estimated auxiliary chamber temperature.

Third Embodiment

Next, a configuration example of an ignition device according to a third embodiment of the present invention will be described with reference to FIG. 18.

Figure 18:
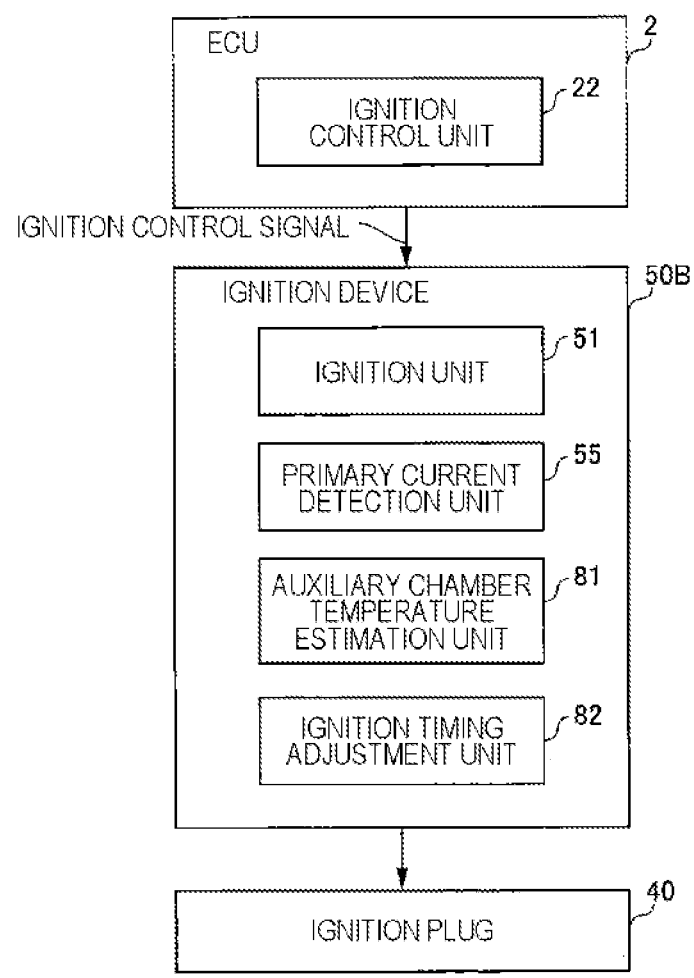
FIG. 18 is a diagram illustrating a configuration example of an ignition device according to a third embodiment of the present invention.

FIG. 18 is an explanatory diagram illustrating a configuration example of an ignition device 50B. The ignition device 50B is based on the configuration of the ignition device 50 according to the first embodiment, but is different in that it includes an auxiliary chamber temperature estimation unit 81 and an ignition timing adjustment unit 82. Since the auxiliary chamber temperature estimation unit 21 is excluded from the ECU 2, the ignition device information is not output from the ignition device 50B to the ECU 2.

The ignition device 50B includes, for example, a micro processing unit (MPU), a read only memory (ROM), and a random access memory (RAM). The ignition device 50B can adjust the ignition timing of the ignition plug 40 even when the ECU 2 receives the ignition control signal output without determining the ignition timing. Therefore, the ignition device (ignition device 50B) can operate the ignition plug (ignition plug 40) by controlling the ignition timing based on an instruction (reception of an ignition control signal) from the internal combustion engine control device (ECU 2). The ignition device (ignition device 50B) includes an auxiliary combustion chamber temperature estimation unit (auxiliary chamber temperature estimation unit 81) that estimates the temperature of the auxiliary combustion chamber (auxiliary chamber 42), and an ignition timing adjustment unit (ignition timing adjustment unit 82) that delays the ignition timing at a first decrease degree defined in accordance with a change amount of the ignition timing with respect to the temperature of the auxiliary combustion chamber (auxiliary chamber 42) as the temperature of the auxiliary combustion chamber (auxiliary chamber 42) increases in a case where the temperature of the auxiliary combustion chamber (auxiliary chamber 42) is included in a middle temperature region equal to or lower than a first set temperature.

The auxiliary combustion chamber temperature estimation unit (auxiliary chamber temperature estimation unit 81) estimates the temperature of the auxiliary combustion chamber (auxiliary chamber 42) based on the temporal change of the primary current in the charge period in which the primary coil (primary coil 52) is charged with energy.

Based on the ignition control signal input from the ignition control unit (ignition control unit 22), the ignition timing adjustment unit (ignition timing adjustment unit 82) outputs the ignition control signal to the igniter (igniter 54) at the ignition timing adjusted according to the estimated temperature of the auxiliary combustion chamber (auxiliary chamber 42). For example, when the ignition control signal is input from the ignition control unit 22, the ignition timing adjustment unit 82 performs adjustment (referred to as "ignition adjustment") to change the ignition timing to an advance angle or an angle close thereto according to the estimated auxiliary chamber temperature by advancing or delaying the timing of outputting the ignition control signal to the igniter 54. Here, the ignition timing adjustment unit 82 can adjust ignition according to the process when the auxiliary chamber temperature is low (see FIG. 12) and the process when the auxiliary chamber temperature is high (see FIG. 14) performed by the ignition control unit 22 according to the first embodiment.

In the ignition device 50B according to the third embodiment described above, the ignition timing adjustment unit 82 adjusts the ignition timing of the ignition plug 40 on the basis of the auxiliary chamber temperature estimated by the auxiliary chamber temperature estimation unit 81. Therefore, the ECU 2 does not need to perform the process of adjusting the ignition timing, and a processing load of the ECU 2 can be reduced. In addition, the ignition device 50B can adjust the ignition timing corresponding to the ignition plug 40 according to the situation of the ignition plug 40.

Note that the secondary current detection unit 59 included in the ignition device 50A according to the second embodiment may be replaced with the primary current detection unit 55. Even in this case, the auxiliary chamber temperature estimation unit 81 can estimate the auxiliary chamber temperature on the basis of the current information of the detected secondary current, and the ignition timing adjustment unit 82 can adjust the ignition timing of the ignition plug 40 according to the estimated auxiliary chamber temperature.

Fourth Embodiment

Next, a configuration example of an ignition device according to a fourth embodiment of the present invention will be described with reference to FIGS. 19 to 21. The ignition device according to the present embodiment detects the ion current flowing through the electrode of the ignition plug and estimates the auxiliary chamber temperature.

Figure 19:
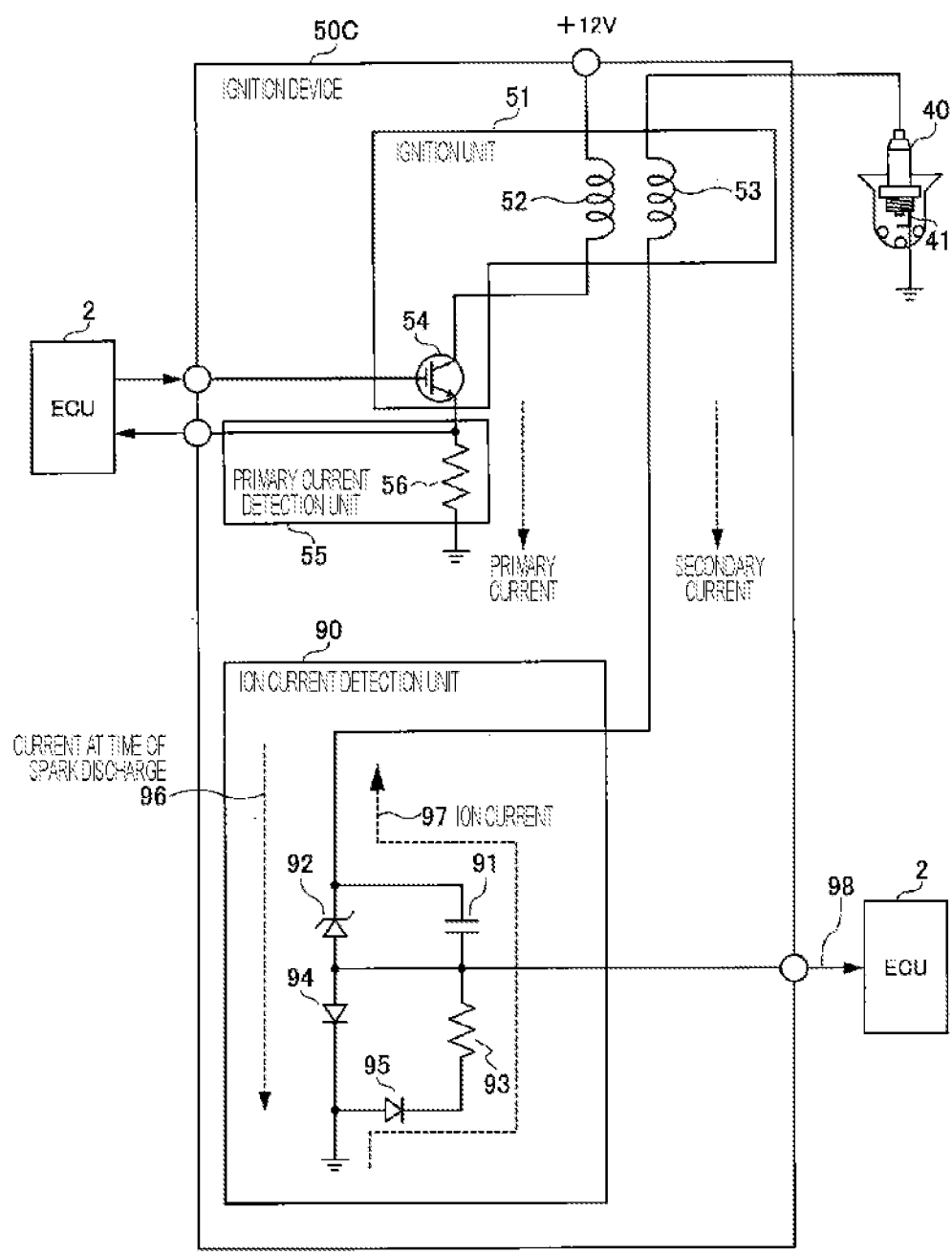
FIG. 19 is a diagram illustrating a configuration example of an ignition device according to a fourth embodiment of the present invention.

FIG. 19 is an explanatory diagram illustrating a configuration example of an ignition device 50C.

The ignition device 50C includes an ion current detection unit 90 in addition to the ignition unit 51 and the primary current detection unit 55 in each embodiment described above.

The ion current detection unit 90 includes a capacitor 91, a Zener diode 92 for charge voltage control connected in parallel to the capacitor 91, and a voltage conversion resistor 93 connected to the capacitor 91. In addition, the ion current detection unit 90 includes a secondary current path diode 94 that connects the connection points of the capacitor 91, the Zener diode 92, and the voltage conversion resistor 93 to a GND portion, and an ion current path diode 95 that connects the capacitor 91 to the GND portion via the voltage conversion resistor 93.

When the ignition control signal supplied from the ECU 2 to the ignition device 50C is turned on, a primary current flows through the primary coil 52 via the igniter 54. When the ignition control signal is turned off and the primary current is cut off, an electromotive force is generated in the secondary coil 53, a high voltage is applied to the tip of the ignition plug 40, and spark discharge occurs. The spark discharge ignites the air-fuel mixture in the cylinder 38 of the internal combustion engine (engine 13).

When a discharge spark is generated in the ignition plug 40, a secondary current flows along a direction of an arrow 96 of the ion current detection unit 90. When the voltage of the secondary coil 53 decreases to be lower than a breakdown voltage (for example, 100 V) of the Zener diode 92, a current flows into the capacitor 91 and charges the capacitor 91.

The flame generated in the electrode 41 by the spark discharge is ejected into the main chamber 37 as a flame jet 44 (see FIG. 4). Ions such as chemical ions and thermal ions exist in the auxiliary chamber 42 as intermediate products in the combustion process. When the discharge spark of the ignition plug 40 disappears and the secondary current stops flowing, the charge accumulated in the capacitor 91 is discharged, and the voltage for ion current detection is applied to the ignition plug 40 via the secondary coil 53. By this voltage application, an ion current is generated in the electrode 41 of the ignition plug 40. At this time, a voltage (for example, 100 V) is applied to the ignition plug 40 by the capacitor 91 charged with electric charge at the time of spark discharge. Since the ignition plug 40 traps cations and electrons in the auxiliary chamber 42 by the voltage applied by the capacitor 91, an ion current flows in the direction of an arrow 97 of the ion current detection unit 90.

The ion current flows to the ion current path diode 95 via the GND portion, is subjected to voltage conversion by the voltage conversion resistor 93, and then a voltage corresponding to the magnitude of the ion current is transmitted to the ECU 2 as the ion signal 98.

Therefore, the ion current detection unit (ion current detection unit 90) detects the ion current flowing through the electrode (electrode 41) after the spark discharge at the electrode (electrode 41) is settled, and outputs the ion signal 98.

When determining that the air-fuel mixture is normally combusted based on the shape pattern of the integrated value of the ion signal 98 generated after the ignition control signal is turned off, the auxiliary combustion chamber temperature estimation unit (auxiliary chamber temperature estimation unit 21) estimates the temperature of the auxiliary combustion chamber (auxiliary chamber 42) and outputs information on the estimated temperature of the auxiliary combustion chamber (auxiliary chamber 42) to the ignition control unit (ignition control unit 22).

Figure 20:
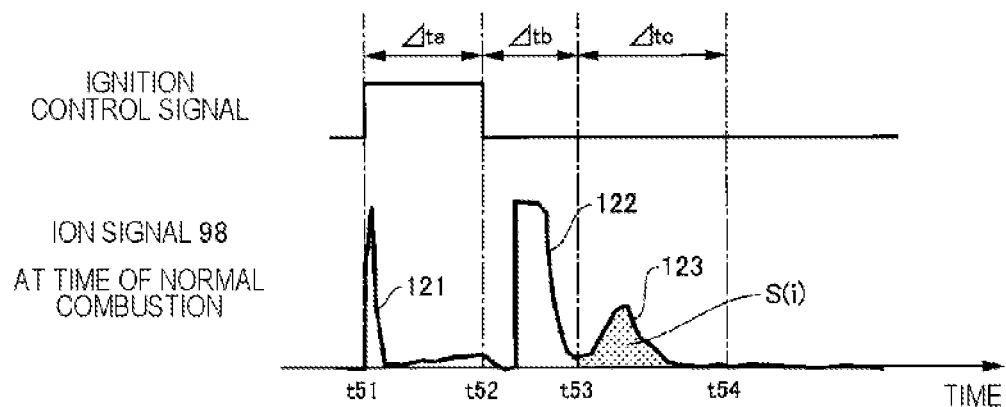

FIG. 20 is a diagram illustrating an example of changes in the ignition control signal and the ion signal. FIG. 20 illustrates an example of the ion signal 98 during normal combustion. In this graph, a horizontal axis represents time.

The ion signal has a feature that three mountains appear. A first mountain 121 is a waveform seen when the ion current detection unit 90 is built in the ignition device 50C, and is generated between times t51 and t52 (Δta). When the ignition control signal is input at the time t51, the ion current flowing through the ion current detection unit 90 is output as an ion signal. Actually, since there is no combustion flame in the auxiliary chamber 42 at the timing, this ion signal is processed as noise.

A second mountain 122 is a waveform seen after the ignition control signal is cut off at the time t52 after the charging time Δta from time t51 and a spark flies to the electrode 41 of the ignition plug 40, and is generated between times t52 and t53 (Δtb). Although the ion signal cannot be detected while a spark is flying to the electrode 41, the ion current detection unit then detects the ion component in the initial combustion flame.

A third mountain 123 is a waveform detected in the process in which the combustion flame spreads throughout the combustion chamber, and is generated between times t53 and t54 (Δtc). The ion current detection unit 90 detects the ion component in the flame in the main combustion portion, and the auxiliary chamber temperature estimation unit 21 calculates the integrated value S (i) of the ion signal by Δtc.

FIG. 21 is a diagram illustrating a relationship between the ion signal integrated value S(i) and a maximum in-cylinder temperature. In FIG. 21, the results acquired by changing various parameters such as the engine load, the engine speed, and the air-fuel ratio are plotted.

As can be seen from FIG. 21, the ion signal has a strong correlation with the maximum in-cylinder temperature, and as the maximum in-cylinder temperature [K] increases, the ion signal integrated value S(i) increases. For example, under a condition where the engine load is large, the in-cylinder deepest temperature increases, and thus, the ion signal integrated value also increases. The auxiliary chamber temperature estimation unit 21 can obtain the maximum in-cylinder temperature based on the ion signal integrated value by the correlation illustrated in FIG. 21. Then, the ignition control unit 22 can estimate the auxiliary chamber temperature on the basis of the change in the maximum in-cylinder temperature, and perform ignition control to delay or advance the ignition timing.

In the auxiliary chamber temperature estimation unit 21 according to the fourth embodiment described above, it is possible to determine whether normal combustion is performed in the auxiliary chamber 42 or whether knock or misfire has not occurred by integrating the ion signals. When determining that the inside of the auxiliary chamber 42 is in normal combustion, the auxiliary chamber temperature estimation unit 21 obtains the maximum in-cylinder temperature based on the change in the ion current. As described above, since the maximum in-cylinder temperature is obtained on the basis of the ion current flowing through the electrode of the ignition plug 40, the ignition control unit 22 can perform ignition control to delay or accelerate the ignition timing on the basis of a change in the maximum in-cylinder temperature. At this time, when the auxiliary chamber temperature estimation unit 21 determines that the auxiliary chamber temperature is included in any of the low temperature region, the middle temperature region, and the high temperature region, the ignition control unit 22 performs control to advance or retard the ignition timing in accordance with each region, which is similar to the ECU 2 according to the first embodiment.

[Modification]

The fuel injection device (injector 36) is installed in at least one of an intake system (intake manifold 31), a main combustion chamber (main chamber 37), and an auxiliary combustion chamber (auxiliary chamber 42). For example, in each of the above-described embodiments, an example of adopting the port injection type injector 36 has been described, but a direct injection type injector 36 capable of directly injecting fuel into the main chamber 37 may be adopted. In addition, the injector 36 may be provided in the auxiliary chamber 42 of the ignition plug 40 and may directly inject the fuel into the auxiliary chamber 42.

The second decrease degree in the high temperature region and the third decrease degree in the low temperature region may be the same or different. However, both the second and third decrease degrees are different from the first decrease degree.

In addition, for example, a temperature sensor such as a thermocouple may be installed in a wall of the auxiliary chamber 42, and the ECU 2 may directly measure the auxiliary chamber temperature on the basis of a value detected by the temperature sensor. when the auxiliary chamber temperature can be directly measured in this manner, the accuracy of the measured temperature is improved, and the ignition timing of the ignition plug 40 can be more appropriately controlled.

In addition, a pressure sensor may be installed in a wall of the auxiliary chamber 42 to measure the combustion state in the auxiliary chamber 42. Then, the ECU 2 may estimate the auxiliary chamber temperature based on the combustion state. By using the pressure sensor, it is possible to detect a combustion state other than the temperature.

In each of the above-described embodiments, an example in which the auxiliary chamber 42 having the ignition plug 40 therein is provided in the engine 13 of the hybrid automobile 100 is described. However, the present invention may be applied to a vehicle such as an automobile or a motorcycle having only the engine as a power source. In addition, for example, the auxiliary chamber according to each of the above-described embodiments may be provided in an internal combustion engine used in a generator, and a generator control device may perform control to change the auxiliary chamber temperature estimated from the primary current or the secondary current to an appropriate ignition timing.

The present invention is not limited to the embodiments described above, and it goes without saying that various other application examples and modifications can be taken without departing from the gist of the present invention described in the claims.

For example, the above-described embodiments describe the configurations of the device and the system in detail and specifically in order to describe the present invention in an easy-to-understand manner, and are not necessarily limited to those having all the described configurations. In addition, a portion of the configuration of the embodiment described here can be replaced with the configuration of another embodiment, and furthermore, the configuration of another embodiment can be added to the configuration of a certain embodiment. Further, it is possible to perform addition/deletion/replacement on other configurations with respect to a portion of the configurations of each embodiment.

Further, in the above-described embodiment, control lines or information lines are illustrated as necessary for explanation, and all the control lines or information lines are not necessarily illustrated on products. In practice, it may be considered that almost all the configurations are connected to each other.

REFERENCE SIGNS LIST

1 VCU
1f engine control output unit
2 ECU
13 engine
21 auxiliary chamber temperature estimation unit
22 ignition control unit
36 injector
37 main chamber
40 ignition plug
41 electrode
42 auxiliary chamber
50 ignition device
51 ignition unit
52 primary coil
53 secondary coil
54 igniter
55 primary current detection unit

The invention claimed is:

1. An internal combustion engine control device of controlling output of an internal combustion engine including a cylinder in which an air-fuel mixture in which a fuel injected by a fuel injection device and air taken in from an intake system are mixed is combusted in a main combustion chamber facing a piston, an auxiliary combustion chamber that communicates with the main combustion chamber and takes in the air-fuel mixture from the main combustion chamber, an ignition plug that is attached to the auxiliary combustion chamber and ignites the air-fuel mixture inside the auxiliary combustion chamber, and an ignition device configured to control an ignition timing of the ignition plug, the internal combustion engine control device comprising:

an auxiliary combustion chamber temperature estimation unit configured to estimate a temperature of the auxiliary combustion chamber; and an ignition control unit configured to delay the ignition timing at a first decrease degree defined in accordance with a change amount of the ignition timing with respect to the temperature of the auxiliary combustion chamber as the temperature of the auxiliary combustion chamber increases when the estimated temperature of the auxiliary combustion chamber is included in a middle temperature region equal to or lower than a first set temperature.

2. The internal combustion engine control device according to claim 1, wherein the auxiliary combustion chamber temperature estimation unit estimates a temperature of the auxiliary combustion chamber based on ignition device information acquired from the ignition device.

3. The internal combustion engine control device according to claim 2, wherein when the temperature of the auxiliary combustion chamber is included in a high temperature region higher than the first set temperature, the ignition control unit delays the ignition timing at a second decrease degree larger than the first decrease degree as the temperature of the auxiliary combustion chamber increases.

4. The internal combustion engine control device according to claim 3, wherein the ignition control unit delays the ignition timing at a third decrease degree larger than the first decrease degree as the temperature of the auxiliary combustion chamber increases in a case where the temperature of the auxiliary combustion chamber is included in a low temperature region that is equal to or lower than a second set temperature that is a lower limit of the middle temperature region.

5. The internal combustion engine control device according to claim 4, wherein
the first set temperature is a temperature at which the air-fuel mixture starts to ignite at pre-ignition,
the second set temperature is a temperature at which combustion of the air-fuel mixture starts to be stabilized in the middle temperature region, and
when the temperature of the auxiliary combustion chamber is included in the middle temperature region, the ignition control unit determines the first decrease degree in accordance with an ignition timing at which the internal combustion engine generates maximum torque.

6. The internal combustion engine control device according to claim 5, wherein
the ignition device includes an ignition unit including a primary coil to which a primary current is applied, an igniter that applies the primary current to the primary coil when an ignition control signal is turned on and cuts off the primary current when the ignition control signal is turned off, and a secondary coil that outputs, to an electrode, a secondary current generated when the igniter with the ignition control signal turned off cuts off the primary current,
the auxiliary combustion chamber temperature estimation unit estimates the temperature of the auxiliary combustion chamber based on a temporal change of the primary current in a charge period in which energy is charged to the primary coil, and
the ignition control unit outputs an ignition control signal for switching on or off of the igniter to the ignition device.

7. The internal combustion engine control device according to claim 6, wherein
the ignition device includes a primary current detection unit that detects the primary current, and
the auxiliary combustion chamber temperature estimation unit estimates the temperature of the auxiliary combustion chamber based on a change in the primary current detected by the primary current detection unit when the ignition control signal is turned on or off.

8. The internal combustion engine control device according to claim 7, wherein
the auxiliary combustion chamber temperature estimation unit estimates the temperature of the auxiliary combustion chamber based on a fact that an increase amount per unit time of the primary current flowing when the ignition control signal is turned on is smaller than an increase amount per unit time of the primary current in the low temperature region, and
the ignition control unit delays the ignition timing based on the estimated temperature of the auxiliary combustion chamber.

9. The internal combustion engine control device according to claim 7, wherein
the auxiliary combustion chamber temperature estimation unit estimates the temperature of the auxiliary combustion chamber based on an undershoot amount when the ignition control signal is turned off and the primary current returns to a value before the ignition control signal is turned on, and
the ignition control unit delays the ignition timing based on the estimated temperature of the auxiliary combustion chamber.

10. The internal combustion engine control device according to claim 7, wherein
the auxiliary combustion chamber temperature estimation unit estimates the temperature of the auxiliary combustion chamber based on a fact that a time, until the primary voltage applied to the primary coil when the ignition control signal is turned off returns to a value before the ignition control signal is turned on, increases and
the ignition control unit delays the ignition timing based on the estimated temperature of the auxiliary combustion chamber.

11. The internal combustion engine control device according to claim 5, wherein
the ignition device includes:
an ignition unit including a primary coil to which a primary current is applied, an igniter that applies the primary current to the primary coil when an ignition control signal is turned on and cuts off the primary current when the ignition control signal is turned off, and a secondary coil that outputs, to an electrode, a secondary current generated when the igniter with the ignition control signal turned off cuts off the primary current; and
a secondary current detection unit that detects the secondary current and outputs the ignition device information including a value of the secondary current to the auxiliary combustion chamber temperature estimation unit, and
the auxiliary combustion chamber temperature estimation unit estimates a temperature of the auxiliary combustion chamber based on a change in the secondary current acquired from the ignition device information.

12. The internal combustion engine control device according to claim 11, wherein
the auxiliary combustion chamber temperature estimation unit estimates the temperature of the auxiliary combustion chamber based on a fact that a time, until the secondary current that increases when the ignition control signal is turned off decreases and returns to a value before the ignition control signal is turned on, increases and
the ignition control unit delays the ignition timing based on the estimated temperature of the auxiliary combustion chamber.

13. The internal combustion engine control device according to claim 5, wherein
the ignition device includes:
an ignition unit including a primary coil to which a primary current is applied, an igniter that applies the primary current to the primary coil when an ignition control signal is turned on and cuts off the primary current when the ignition control signal is turned off, and a secondary coil that outputs, to an electrode, a secondary current generated when the igniter with the ignition control signal turned off cuts off the primary current; and
an ion current detection unit that detects an ion current flowing through the electrode after the spark discharge at the electrode is settled, and outputs an ion signal, and the auxiliary combustion chamber temperature estimation unit estimates the temperature of the auxiliary combustion chamber and outputs information on the estimated temperature of the auxiliary combustion chamber to the ignition control unit when it is determined that the air-fuel mixture is normally combusted on the basis of a shape pattern of an integrated value of the ion signal generated after the ignition control signal is turned off.

14. The internal combustion engine control device according to claim 1 wherein the fuel injection device is installed in at least one of the intake system, the main combustion chamber, and the auxiliary combustion chamber.

15. An ignition device for operating an ignition plug by controlling an ignition timing, based on instruction from an internal combustion engine control device of controlling output of an internal combustion engine including a cylinder in which an air-fuel mixture in which a fuel injected by a fuel injection device and air taken in from an intake system are mixed is combusted in a main combustion chamber facing a piston, an auxiliary combustion chamber that communicates with the main combustion chamber and takes in the air-fuel mixture from the main combustion chamber, and the ignition plug that is attached to the auxiliary combustion chamber and ignites the air-fuel mixture inside the auxiliary combustion chamber, the ignition device comprising:

an auxiliary combustion chamber temperature estimation unit that estimates a temperature of the auxiliary combustion chamber; and an ignition timing adjustment unit that delays the ignition timing by a first decrease degree defined in accordance with a change amount of the ignition timing with respect to the temperature of the auxiliary combustion chamber as the temperature of the auxiliary combustion chamber increases when the estimated temperature of the auxiliary combustion chamber is included in a middle temperature region equal to or lower than a first set temperature.

\* \* \* \* \*